US012534001B2

(12) United States Patent
Mo

(10) Patent No.: US 12,534,001 B2
(45) Date of Patent: Jan. 27, 2026

(54) SIDE IMPACT PROTECTION BLOCK, MOUNTING BASE, AND CHILD SAFETY SEAT

(71) Applicant: Bambino Prezioso Switzerland AG, Steinhausen (CH)

(72) Inventor: Xiaolong Mo, Steinhausen (CH)

(73) Assignee: Bambino Prezioso Switzerland AG, Steinhausen (CH)

( * ) Notice: Subject to any disclaimer, the term of this patent is extended or adjusted under 35 U.S.C. 154(b) by 169 days.

(21) Appl. No.: 18/555,174

(22) PCT Filed: Apr. 21, 2022

(86) PCT No.: PCT/EP2022/060581
§ 371 (c)(1),
(2) Date: Oct. 12, 2023

(87) PCT Pub. No.: WO2022/223706
PCT Pub. Date: Oct. 27, 2022

(65) Prior Publication Data

US 2024/0034204 A1 Feb. 1, 2024

(30) Foreign Application Priority Data

Apr. 21, 2021 (CN) ........................ 202110432465.4

(51) Int. Cl.
*B60N 2/28* (2006.01)

(52) U.S. Cl.
CPC ................................. *B60N 2/2884* (2013.01)

(58) Field of Classification Search
CPC ... B60N 2/2884; B60N 2/2872; B60N 2/4235
See application file for complete search history.

(56) References Cited

U.S. PATENT DOCUMENTS 7,854,482 B2 12/2010 Chen et al.
9,908,444 B2 3/2018 Haas et al.
(Continued)

FOREIGN PATENT DOCUMENTS

CA 3086830 A1 1/2021
CN 201011989 Y 1/2008
(Continued)

OTHER PUBLICATIONS

International Search Report and Written Opinion for Application No. PCT/EP2022/060581 dated Aug. 8, 2022.
(Continued)

*Primary Examiner* — Eric J Kurilla
(74) *Attorney, Agent, or Firm* — Volpe Koenig

(57) ABSTRACT

A side impact protection block includes a housing, the housing includes a top wall, a side wall, and a bottom wall, and the top wall includes a side impact contact surface; a button, the button is disposed on the side wall of the housing, and the button is capable of being pressed by a pressing force to a pressing position and elastically return to an initial position after the pressing force is removed; and a locking member, the locking member is disposed in the housing and includes a locking portion, the button is operably connected to the locking member, when the button is switched from the initial position to the pressing position, the locking member is driven by the button to be in an unlocked state, and when the button elastically returns to the initial position, the locking portion of the locking member elastically returns to a locked state.

31 Claims, 16 Drawing Sheets

(56) References Cited

U.S. PATENT DOCUMENTS

| | | | | |
|---|---|---|---|---|
| 10,994,689 | B2 * | 5/2021 | Chi | B60N 2/2884 |
| 11,338,765 | B2 | 5/2022 | Chen | |
| 11,560,073 | B2 | 1/2023 | Pos | |
| 2008/0169697 | A1 | 7/2008 | Chen et al. | |
| 2016/0039319 | A1 * | 2/2016 | Zhang | B60N 2/2887 297/216.11 |
| 2019/0176746 | A1 | 6/2019 | Chen | |
| 2022/0305974 | A1 * | 9/2022 | Hsu | B60N 2/888 |
| 2023/0211709 | A1 | 7/2023 | Chen | |

FOREIGN PATENT DOCUMENTS

| | | | | | |
|---|---|---|---|---|---|
| CN | 207028930 | U | | 2/2018 | |
| CN | 107921892 | A | * | 4/2018 | B60N 2/2851 |
| CN | 207190848 | U | | 4/2018 | |
| CN | 107985143 | A | * | 5/2018 | B60N 2/2821 |
| CN | 207360133 | U | * | 5/2018 | |
| CN | 207449681 | U | | 6/2018 | |
| CN | 207535737 | U | | 6/2018 | |
| CN | 108437860 | A | * | 8/2018 | B60N 2/2884 |
| CN | 208585133 | U | | 3/2019 | |
| CN | 208827649 | U | * | 5/2019 | |
| CN | 109895664 | A | | 6/2019 | |
| CN | 110126773 | A | * | 8/2019 | B60N 2/2812 |
| CN | 110271464 | A | | 9/2019 | |
| CN | 210011644 | U | | 2/2020 | |
| CN | 111845481 | A | * | 10/2020 | B60N 2/2872 |
| CN | 112092692 | A | | 12/2020 | |
| CN | 212950271 | U | | 4/2021 | |
| CN | 214189398 | U | | 9/2021 | |
| CN | 113895326 | A | | 1/2022 | |
| DE | 202012102471 | U1 | | 10/2012 | |
| DE | 202018006455 | U | | 9/2020 | |
| GB | 2531121 | A | | 4/2016 | |
| JP | 2002240603 | A | | 8/2002 | |
| JP | 2006123651 | A | | 5/2006 | |
| KR | 200266416 | Y1 | | 2/2002 | |
| KR | 20160028448 | A | * | 3/2016 | |
| WO | 0110668 | A1 | | 2/2001 | |

OTHER PUBLICATIONS

Office Action issued in corresponding Taiwanese Application No. 111115245 dated Dec. 28, 2022. English Translation Provided.

Office Action issued in corresponding Taiwanese Application No. 111115245 dated Jun. 7, 2023. English Translation Provided.

Notification of Registration Issued in Corresponding Chinese Patent Application No. 202110432465.4, Mailed Date: May 31, 2024, 12 pages.

Office Action issued in corresponding Chinese Application No. 202110432465.4 dated Dec. 6, 2023.

Cao, et al. "Discuss on the Developement Trend and Structural Features of Child Safety Seat" State Key Laboratory of Advanced Design and Manufacturing for Vehicle body, Hunan University, Changsha Hunan 410082, China, Mar. 2010 (English Translation of Abstract Included).

"Lateral Impact Sled Test System for Child Restraint Systeem Based on ECE R129" J Automotive Safety and Energy, 2015, vol. 6 No. 3 (English Translation of Abstract Included).

"First Office Action Issued in Corresponding Japanese Patent Application No. 2023-562297", along with Partial Translation, Mailed Date: Oct. 29, 2024, 4 pages.

* cited by examiner

SIDE IMPACT PROTECTION BLOCK, MOUNTING BASE, AND CHILD SAFETY SEAT

CROSS-REFERENCE TO RELATED APPLICATIONS

This application is an U.S. national phase application under 35 U.S.C. § 371 based upon international patent application No. PCT/EP2022/060581, filed on Apr. 21, 2022, which claims the priority of Chinese patent application 2021104324654, filed on Apr. 21, 2021, and entitled "SIDE IMPACT PROTECTION BLOCK, MOUNTING BASE, AND CHILD SAFETY SEAT", the entire content of which are incorporated herein by reference.

TECHNICAL FIELD

The present disclosure relates to a vehicle infant carrier, and in particular, to a side impact protection block, a mounting base, and a child safety seat.

BACKGROUND

A child safety seat is a seat specially designed for children, which is configured to be mounted on a seat of a vehicle, to effectively improve the safety of children riding the seat. An outside of a side wing of the child safety seat is provided with a side impact protection mechanism to protect the child from the impact of the lateral movement of the seat. Currently, most side impact protection mechanisms include two pivot blocks mounted on both side wings of the seat, and each pivot block is pivotally opened when in use and is pivotally closed when not in use.

SUMMARY

According to some embodiments, a side impact protection block, a mounting base configured to mount the side impact protection block, and a child safety seat are provided.

The side impact protection block includes a housing, wherein the housing includes a top wall, a side wall connected to the top wall, and a bottom wall connected to the side wall, and the top wall includes a side impact contact surface; a button, wherein the button is disposed on the side wall of the housing, and the button is capable of being pressed by a pressing force to a pressing position and elastically return to an initial position after the pressing force is removed; and a locking member, wherein the locking member is disposed in the housing and includes a locking portion, the button is operably connected to the locking member, when the button is switched from the initial position to the pressing position, the locking member is driven by the button to be in an unlocked state, and when the button elastically returns to the initial position, the locking portion of the locking member elastically returns to a locked state.

A mounting base cooperating with the side impact protection block is provided, wherein the mounting base includes a mounting groove, the mounting groove is configured to partially accommodate the housing of the side impact protection block, and a side wall of the mounting groove is provided with a locking hole.

A child safety seat including the mounting base for the side impact protection block described above is provided.

A child safety seat includes the side impact protection block described above and the mounting base cooperating with the side impact protection block described above. The mounting base is disposed outside a side wing of the child safety seat, the housing of the side impact protection block is partially accommodated in the mounting groove of the mounting base, and the locking member is configured to be engaged with the locking hole and be disengaged from the locking hole upon driving by the button.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
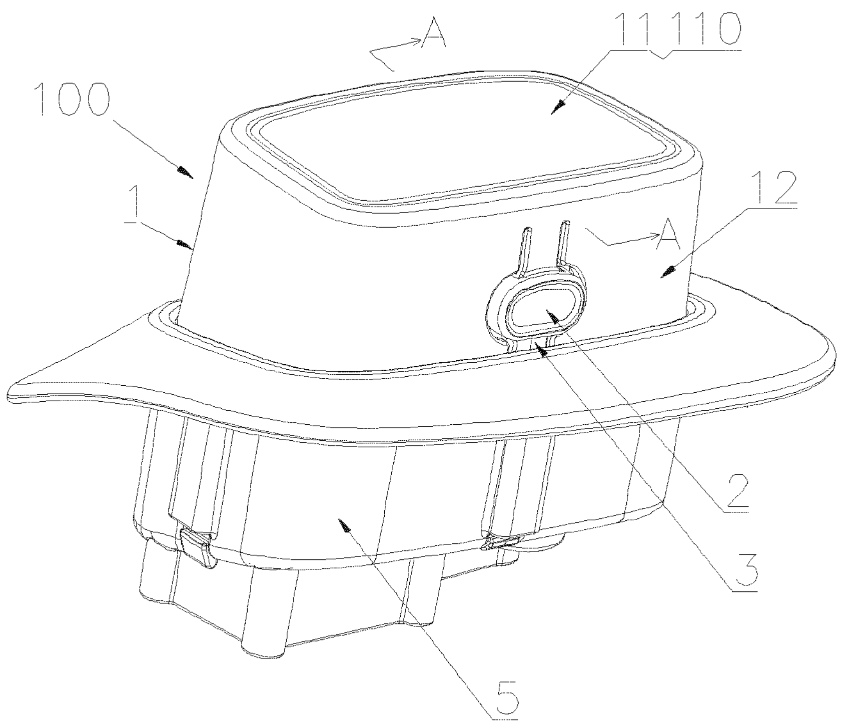
FIG. 1 shows a schematic perspective view of a side impact protection block mounted on a mounting base according to an embodiment of the present disclosure.

Embodiments of the application are described more fully hereinafter with reference to the accompanying drawings. The various embodiments of the application may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 32:
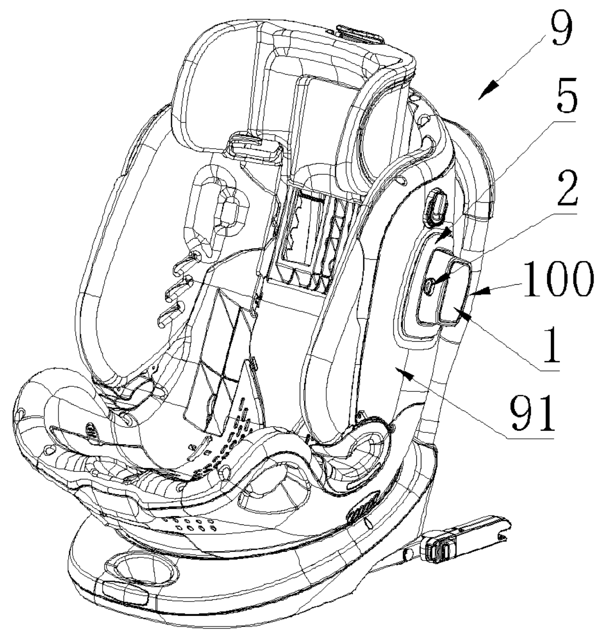
FIG. 32 shows a schematic perspective view of a child safety seat according to an embodiment of the present disclosure.
Figure 33:
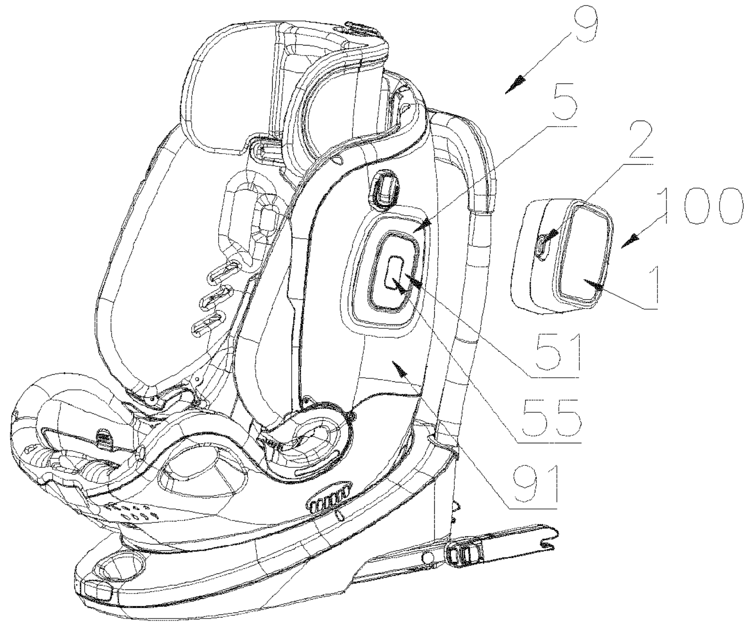
FIG. 33 shows a schematic perspective view of the child safety seat in FIG. 32 with a side impact protection block removed.

Referring to FIG. 1 to FIG. 4, which show schematic views of a side impact protection block 100 and a mounting base 5 cooperating with the side impact protection block 100 according to an embodiment of the present disclosure. Referring to FIG. 32, the side impact protection block 100 and the mounting base 5 are configured to be mounted on a side wing 91 of a child safety seat 9. The child safety seat 9 is mounted, for example, in the interior of a car or another vehicle. In the following description, the child safety seat 9 mounted in a car is taken as an example. When the car is in emergency braking or accidental collision, through the contact of the side impact protection block 100 with an inner side wall of the vehicle, the lateral movement of the child safety seat 9 is restrained and buffered, thereby providing enhanced protection for a child or infant riding in the child safety seat 9. Referring to FIG. 33, the mounting base 5 is fixedly disposed on the side wing 91 of the child safety seat 9, and the side impact protection block 100 is detachably mounted on the mounting base 5.

The side impact protection block 100 includes a housing 1, a button 2, and a locking member 3, and the numbers of the button 2 and the locking member 3 are not limited to one. The housing 1 includes a top wall 11, a side wall 12 connected to the top wall 11, and a bottom wall 13 connected to the side wall 12. The top wall 11 includes a side impact contact surface 110, which is configured to strike the inner side wall of the vehicle when the child safety seat 9 has a tendency to move laterally, thereby limiting the lateral movement of the child safety seat 9. It should be understood that, since the child safety seat 9 is usually mounted on a side of the rear seat of the vehicle, only the side impact protection block 100 on one side of the child safety seat 9 plays the role of preventing lateral movement. The side impact protection block 100 is detachably connected to the mounting base 5, thus two mounting bases 5 are provided on both side wings 91 of the child safety seat 9, and the side impact protection block 100 is mounted in the mounting base 5 on either side of the child safety seat 9 as required. Although in the illustrated embodiment, the side impact contact surface 110 is a relatively smooth arc-shaped surface, in another embodiment, a shape of the side impact contact surface 110 is a plane, as long as it plays a role of contacting the inner side of the vehicle to prevent lateral movement.

Referring to FIG. 1, the button 2 is disposed on the side wall 12 of the housing 1. The locking member 3 is disposed on the side wall 12 of the housing 1 and includes a locking portion. The button 2 is pressed by a pressing force and is operably connected to the locking member 3, such that the locking member 3 has a locked state and an unlocked state. An operable connection in the present disclosure includes, but is not limited to, a direct connection, an indirect connection, a fixed connection, a pivot connection, an abutting contact, or the like. When two components are operably connected together, it means that an action of one component causes an action of the other component.

Figure 2:
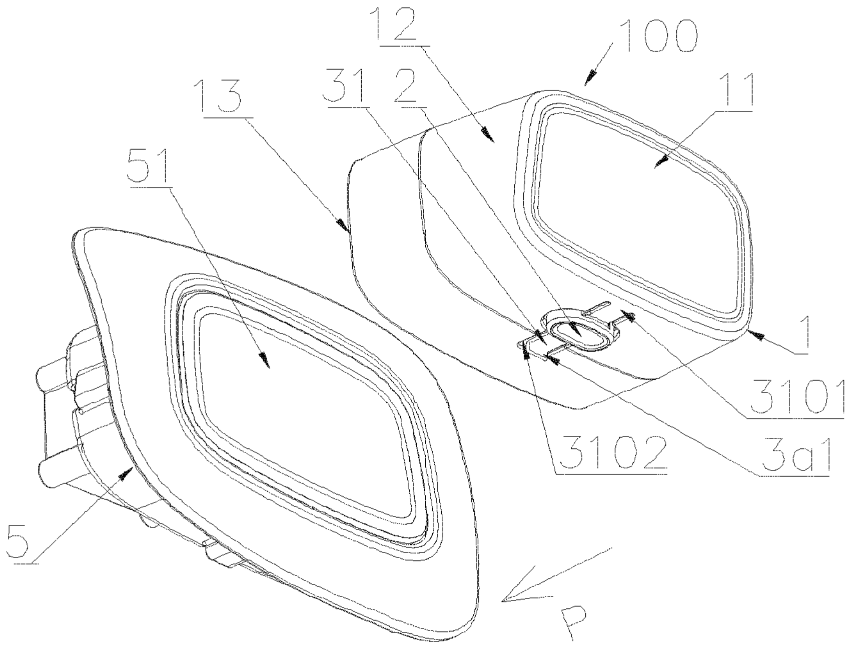
FIG. 2 shows a schematic perspective view of the side impact protection block in FIG. 1 removed from a mounting base.
Figure 3:
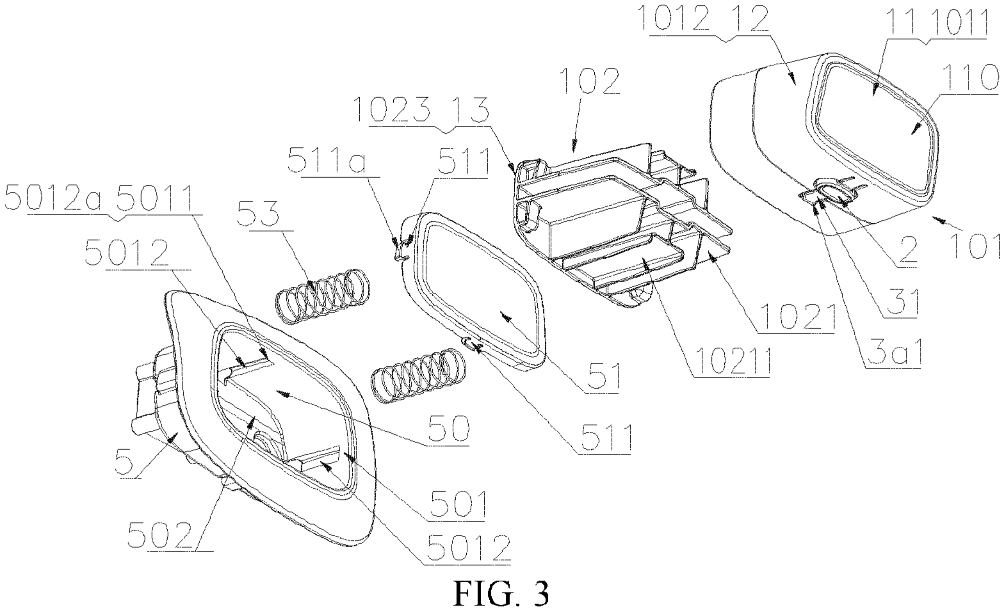
FIG. 3 shows a schematic exploded view of the side impact protection block and the mounting base in FIG. 1.
Figure 4:
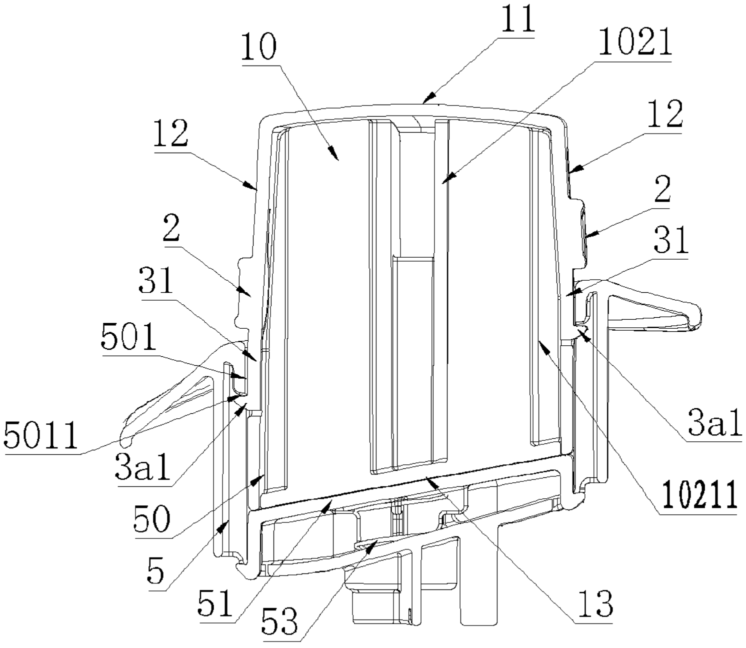
FIG. 4 shows a schematic cross-sectional view taken along a line A-A in FIG. 1, where the button is in an initial position, and the locking portion of a locking member is in a locked state.

Referring to FIG. 2 to FIG. 4, in this embodiment, the locking member 3 includes a first elastic arm 31 integrally formed with the side wall 12. A first end 3101 of the first elastic arm 31 adjacent to the top wall 11 is a connecting end, and a second end 3102 of the first elastic arm 31 adjacent to the bottom wall 13 is a free end. The locking portion includes a first hook 3*a*1 disposed on the free end. The button 2 is located on a middle portion of the first elastic arm 31. For example, the button 2 is integrally formed with the first elastic arm 31, or the button 2 is attached to the middle portion of the first elastic arm 31. As such, when not subjected to any pressing force, the button 2 is in an initial position, and the first hook 3*a*1 of the first elastic arm 31 is in a locked state at this time. When the button 2 is pressed by a pressing force to move from the initial position to a pressing position, the first elastic arm 31 is driven by the button 2 to be elastically deformed, such that the first hook 3*a*1 moves toward an interior 10 of the housing 1 and is switched from the locked state to an unlocked state. When the pressing force is removed, the first elastic arm 31 elastically recovers, such that the button 2 elastically returns to the initial position, and the first hook 3*a*1 elastically returns to the locked state.

Referring to FIG. 3 and FIG. 4, the mounting base 5 has a mounting groove which is configured to partially accommodate the housing 1 of the side impact protection block 100. It should be understood that the bottom wall 13 and at least a part of the side wall 12 of the housing 1 are accommodated in the mounting groove 50. A side wall 501 of the mounting groove 50 is provided with a locking hole 5011, and the locking hole 5011 is configured to receive the locking portion of the locking member 3. More specifically, in this embodiment, the locking hole 5011 is configured to receive the first hook 3*a*1 of the first elastic arm 31.

Referring to FIG. 2, when the side impact protection block 100 requires to be mounted on the mounting base 5, the button 2 is pressed to cause the first elastic arm 31 to be elastically deformed, such that the first hook 3*a*1 is switched to the unlocked state. Subsequently, the side impact protection block 100 is inserted into the mounting groove 50 in a direction as labeled as an arrow P, and the first hook 3*a*1 also enters the mounting groove 50. It should be understood that, the first hook 3*a*1 has a wedge-shaped surface, such that the side impact protection block 100 is also inserted into the mounting groove 50 without actively pressing the button 2.

Referring to FIG. 4, when the side impact protection block 100 is inserted in place, the pressing force on the button 2 is removed, the first elastic arm 31 elastically recovers, the first hook 3*a*1 is switched to the locked state and is locked in the locking hole 5011 on the side wall 501 of the mounting groove 50, and the button 2 elastically returns to the initial position, such that accidental falling off of the side impact protection block 100 from the mounting groove 50 is prevented. When the side impact protection block 100 requires to be removed from the mounting groove 50, the pressing force is applied to the button 2, and the first elastic arm 31 is elastically deformed again, such that the first hook 3*a*1 is disengaged from the locking hole 5011, and the side impact protection block 100 is then free to be removed from the mounting groove 50.

The side impact protection block 100 has a simple structure and low cost, and it is easily mounted on and removed from the mounting base 5. As such, consumers optionally provide the child safety seat 9 with one or more side impact protection blocks 100 for replacement as required.

Referring to FIG. 2 to FIG. 4, in some embodiments, the housing 1 includes a first housing portion 101 and a second housing portion 102. The first housing portion 101 is a hollow structure having an opening at a bottom thereof. A top wall 1011 of the first housing portion 101 forms the top wall 11 of the housing 1, the side impact contact surface 110 is located on the top wall 1011 of the first housing portion 101. A side wall 1012 of the first housing portion 101 forms the side wall 12 of the housing 1. The first elastic arm 31 is integrally formed with the side wall 1012 of the first housing portion 101. The second housing portion 102 is assembled to a bottom opening of the first housing portion 101. A bottom wall 1023 of the second housing portion 102 seals the bottom opening of the first housing portion 101 and form the bottom wall 13 of the housing 1. The second housing portion 102 further includes a first rib plate set 1021 extending from the bottom wall 1023 of the second housing portion 102 into an interior of the first housing portion 101, and the first rib plate set 1021 has an effect of reinforcing the structural strength of the first housing portion 101. The first rib plate set 1021 includes a first limiting plate 10211 corresponding to the first elastic arm 31, and the first limiting plate 10211 effectively avoids the damage caused by the first elastic arm 31 being excessively pressed.

In other embodiments, the housing 1 does not include the second housing portion 102. In this case, the bottom wall of the first housing portion 101 forms the bottom wall 13 of the housing 1, and the bottom wall of the first housing portion 101 is open or closed. 220414

Referring to FIG. 1 to FIG. 4, in some embodiments, the mounting base 5 includes an end cap 51. When the side impact protection block 100 is not mounted in the mounting groove 50, the end cap 51 is configured to seal an opening of the mounting groove 50, and the end cap 51, for example, is supported at the opening of the mounting groove 50 by at least one fourth elastic member 53 in the mounting groove 50. When the side impact protection block 100 is mounted in the mounting groove 50, the end cap 51 is subjected to a pressing force of the bottom wall 13 of the housing 1 and compresses the fourth elastic member 53. The end cap 51 moves toward a bottom 502 of the mounting groove 50, and at the same time, the locking hole 5011 of the side wall 501 of the mounting groove 50 is exposed and is locked with the locking portion (more specifically, the first hook 3*a*1 of the first elastic arm 31) of the locking member 3 of the side impact protection block 100.

Referring to FIG. 3, in some embodiments, the end cap 51 includes one or more third elastic arms 511. The third elastic arm 511 includes a hook 511*a*. The side wall 501 of the mounting groove 50 includes one or more second sliding holes 5012. The hook 511*a* is engaged with a locking end 5012*a* of the second sliding hole 5012, so as to fix the end cap 51 to a position sealing the opening of the mounting groove 50. When the end cap 51 is subjected to a pressing force, the hook 511*a* moves along the second sliding hole 5012, so as to allow the side impact protection block 100 to be inserted into the mounting groove 50, and to allow the locking hole 5011 to be exposed to cooperate with the locking portion of the locking member 3.

In some embodiments, the fourth elastic member 53 includes two springs spaced apart, which provide sufficient support for the end cap 51 with a larger area. In other embodiments, the fourth elastic member 53 includes one spring or more springs.

In some embodiments, the locking hole 5011 coincides with the locking end 5012*a* of the second sliding hole 5012, which is beneficial to simplify the manufacturing process.

Referring to FIG. 5 to FIG. 10, which show schematic views of a side impact protection block 100 and a mounting base 5 cooperating with the side impact protection block 100 according to another embodiment of the present disclosure. A main difference between this embodiment and the aforementioned embodiment lies in the structure of the side impact protection block 100. Since structures of the mounting base 5 are similar to each other, details will not be repeated herein.

Figure 5:
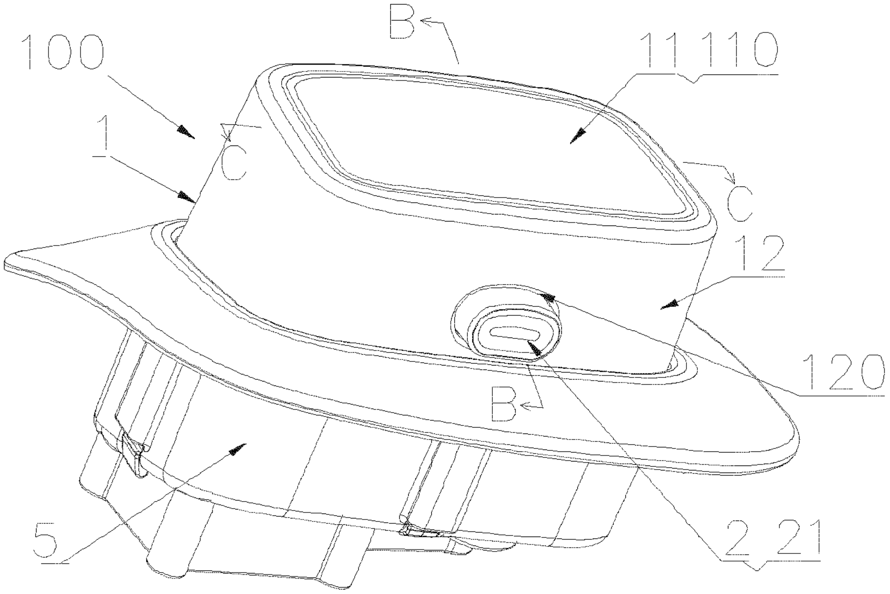
FIG. 5 shows a schematic perspective view of a side impact protection block mounted on a mounting base according to another embodiment of the present disclosure.
Figure 6:
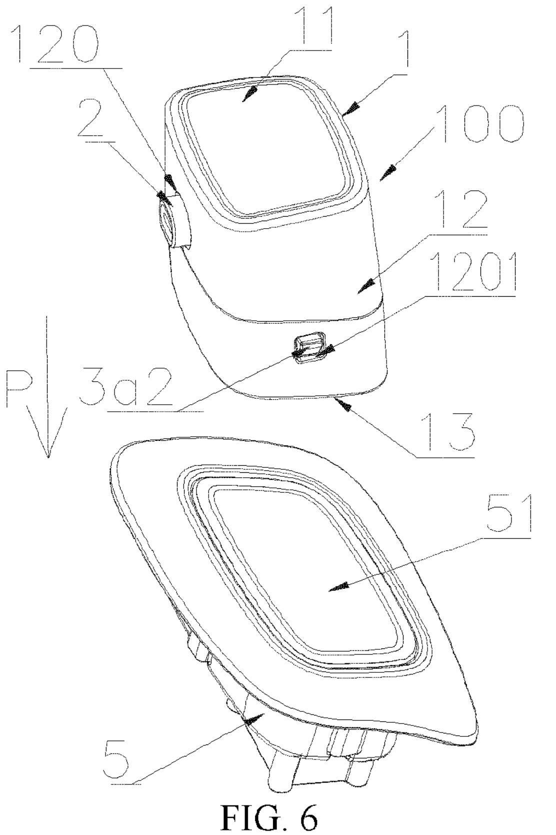
FIG. 6 shows a schematic perspective view of the side impact protection block in FIG. 5 removed from a mounting base.

Referring to FIG. 5 and FIG. 6, as similar to the aforementioned embodiment described above, a housing 1 includes a top wall 11, a side wall 12, and a bottom wall 13. The top wall 11 includes a side impact contact surface 110. A button 2 is disposed on the side wall 12 of the housing 1 and is switchable between an initial position and a pressing position. A locking member 3 is disposed in the housing 1 and includes a locking portion. The button 2 is operably connected to the locking member 3, such that the locking portion of the locking member 3 is switchable between a locked state and an unlocked state.

Figure 7:
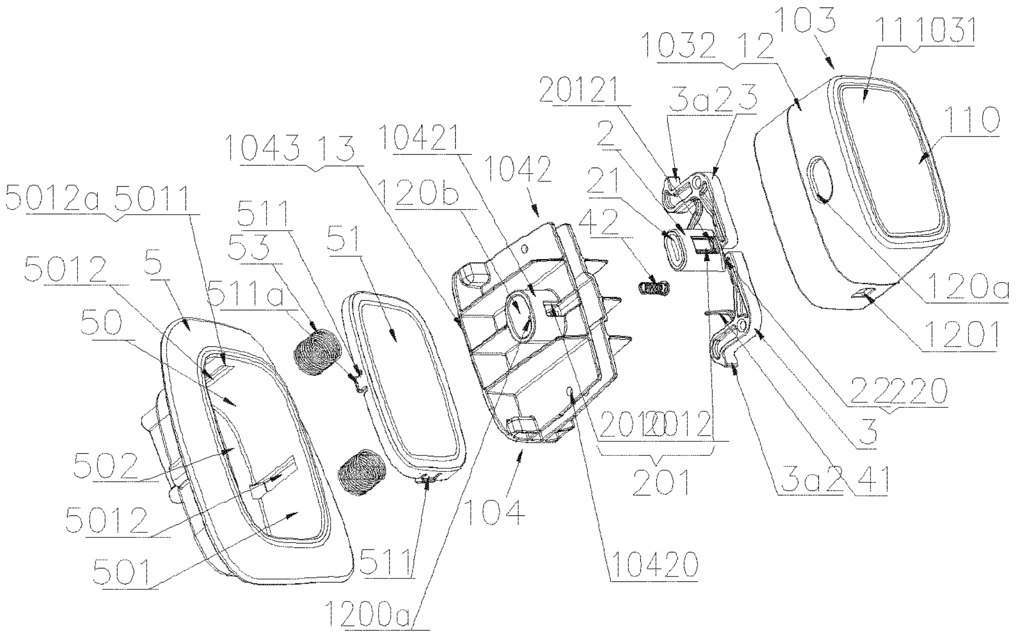
FIG. 7 shows a schematic exploded view of the side impact protection block and the mounting base in FIG. 5.

Referring to FIG. 7, the housing 1 includes a third housing portion 103 and a fourth housing portion 104. The third housing portion 103 is a hollow structure having an opening at bottom. A top wall 1031 of the third housing portion 103 forms the top wall 11 of the housing 1, the side impact contact surface 110 is located on the top wall 1031 of the third housing portion 103, and a side wall 1032 of the third housing portion 103 forms the side wall 12 of the housing 1. The fourth housing portion 104 is assembled to a bottom opening of the third housing portion 103. A bottom wall 1043 of the fourth housing portion 104 seals the bottom opening of the third housing portion 103 and form the bottom wall 13 of the housing 1. The fourth housing portion 104 further includes a second rib plate set 1042 extending from the bottom wall 1043 of the fourth housing portion 104 into an interior of the third housing portion 103, and the second rib plate set 1042 has an effect of reinforcing the structural strength of the third housing portion 103.

Figure 8:
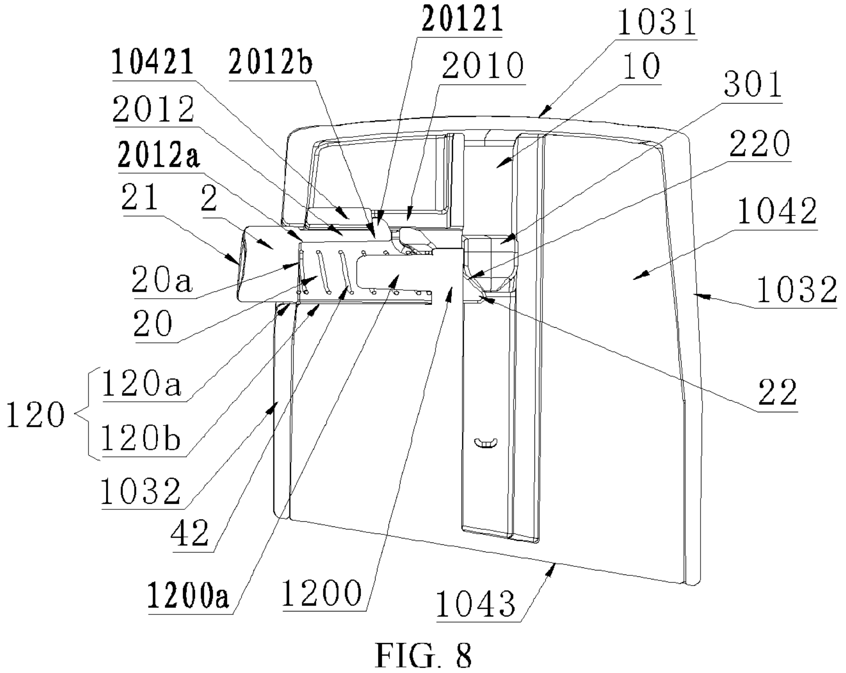
FIG. 8 shows a schematic cross-sectional view taken along a line B-B in FIG. 5, where the button is in an initial position, and the locking portion of a locking member is in a locked state.

Referring to FIG. 5, FIG. 7, and FIG. 8, the button 2 is located in a button hole 120 on the side wall 1032 of the third housing portion 103, and at least a part of a hole wall of the button hole 120 is formed by the side wall 1032. The button 2 includes an outer end 21 configured to bear a pressing force and an inner end 22 located in an interior 10 of the housing 1. In some embodiments, the side wall 1032 is provided with a first hole segment 120*a* configured to be slidably fitted with the button 2, the second rib plate set 1042 includes an annular extension plate 10421, and the annular extension plate 10421 defines a second hole segment 120*b* slidably fitted with the button 2, and the first hole segment 120*a* is in communication with the second hole segment 120*b* to form the button hole 120. In some other embodiments, the annular extension plate 10421 is not disposed on the second rib plate set 1042, but is integrally formed with the side wall 1032.

Figure 9:
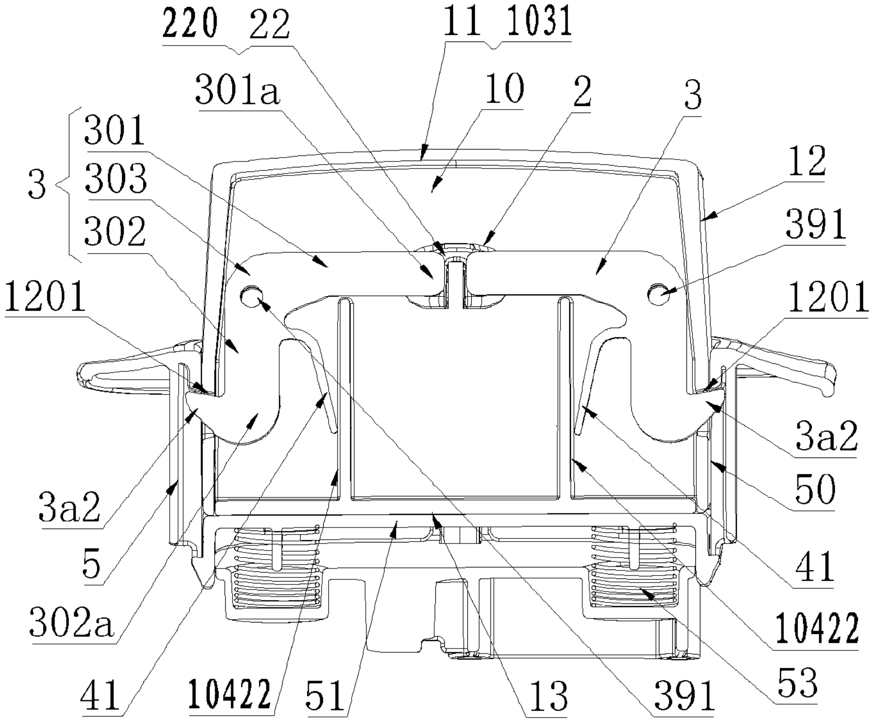
FIG. 9 shows a schematic cross-sectional view taken along a line C-C in FIG. 5, where the button is in an initial position, and the locking portion of a locking member is in a locked state.
Figure 10:
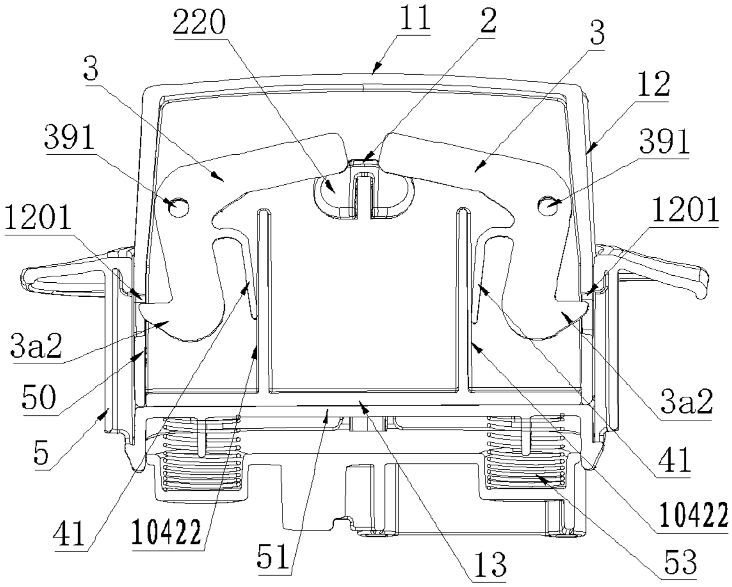
FIG. 10 shows a schematic cross-sectional view taken along a line C-C in FIG. 5 when the button is in a pressing position and the locking portion of a locking member is in an unlocked state.
Figure 11:
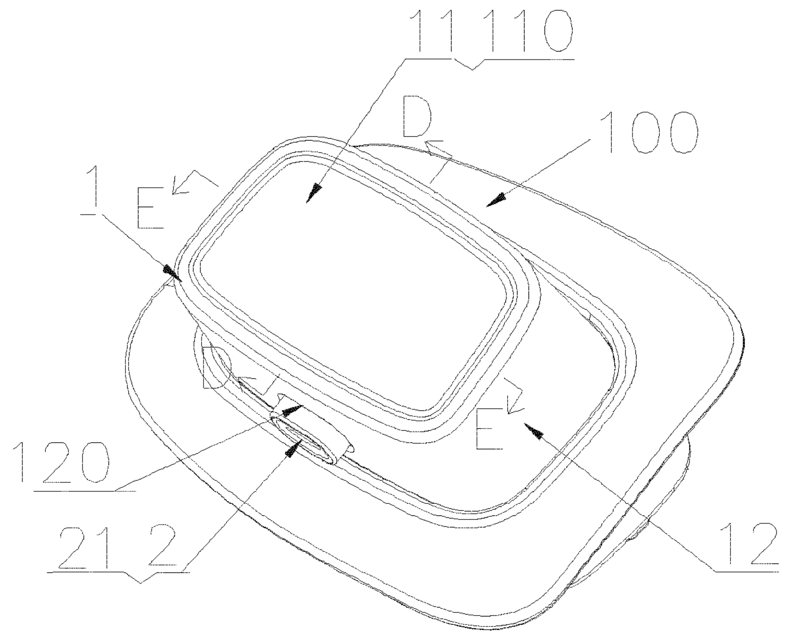
FIG. 11 shows a schematic perspective view of a side impact protection block mounted on a mounting base according to another embodiment of the present disclosure.

Referring to FIG. 9 and FIG. 10, two locking members 3 are located in the interior 10 of the housing 1, and the two locking members 3 are disposed substantially symmetrically in the interior 10 of the housing 1, and are operably connected to the same button 2. A first end 301*a* of the locking member 3 is in contact with an inner end 22 of the button 2. A contact surface of the inner end 22 of the button 2 for contacting the first end 301*a* is an inclined surface 220, and the inclined surface 220 faces the top wall 1031 of the third housing portion 103. A middle portion of each locking member 3 is pivotally connected to the housing 1 via a first pin shaft 391. The first pin shaft 391, for example, is mounted in a hole 10420 (see FIG. 7) of the second rib plate set 1042. The locking portion includes a second hook 3*a*2 located on a second end 302*a* of the locking member 3, and the second hook 3*a*2 is bent toward the side wall 12.

In some embodiments, the locking member 3 is substantially in an L shape, and includes a first arm 301, a corner portion 303, and a second arm 302 that are connected in sequence. A free end of the first arm 301 forms the first end 301*a* of the locking member 3, a first pin shaft 391 is disposed on the corner portion 303. A free end of the second arm 302 forms the second end 302*a* of the locking member 3. The locking member 3 of this configuration has a smaller volume, and has a more reasonable structure.

The side wall 1032 of the third housing portion 103 includes a first through hole 1201 allowing the second hook 3*a*2 to extend through. A first elastic member 41 is further disposed in the interior 10 of the housing 1. Referring to FIG. 8 and FIG. 9, when the button 2 is in an initial position, a tip region of the inclined surface 220 is in contact with the first end 301*a* of the locking member 3, and the first elastic member 41 acts on the locking member 3 to maintain the second hook 3*a*2 in a locked state extending from the first through hole 1201. In that case, the second hook 3*a*2 is engaged in a locking hole 5011 of the mounting base 5, and the side impact protection block 100 is not removed from the mounting groove 50. Referring to FIG. 8 and FIG. 10, when the outer end 21 of the button 2 is subjected to a pressing force, the button 2 is switched from the initial position to the pressing position, and the inclined surface 220 of the button 2 pushes the first arm 301, such that the locking member 3 pivots around the first pin shaft 391 to overcome a force of the first elastic member 41, and the second hook 3*a*2 is switched to an unlocked state retreating from the first through hole 1201. At that time, the side impact protection block 100 is easily removed from the mounting groove 50.

It should be understood that, when the side impact protection block 100 requires to be inserted into the mounting groove 50, the button 2 is pressed to cause the second hook 3*a*2 of the locking member 3 to be in the unlocked state, then the side impact protection block 100 is inserted into the mounting groove 50 in a direction shown as an arrow P in FIG. 6. When the pressing force is removed, the second hook 3*a*2 is locked with the locking hole 5011. Since the second hook 3*a*2 has a wedge-shaped surface, the side impact protection block 100 is also inserted into the mounting groove 50 without actively pressing the button 2.

Referring to FIG. 7, FIG. 9, and FIG. 10, in some embodiments, the first elastic member 41 includes a reset strip connected to the second arm 302 of the locking member 3, and a limiting wall 10422 in contact with the reset strip is disposed in the interior of the housing 1. When the button 2 is pressed to the pressing position, the locking member 3 pivots under an action of the inclined surface 220, which not only causes the second hook **3*a*2 to be switched from the locked state to the unlocked state, but also causes the reset strip to be elastically deformed. When the button 2 elastically returns to the initial position, the reset strip drives the locking member 3 to pivot around the first pin shaft 391 while automatically elastically recovers, such that the second hook 3*a*2** elastically returns to the locked state and maintains in the locked state.

In some embodiments, a free end of the reset strip is in contact with the limiting wall 10422, and the other end of the reset strip opposite to the free end extends to the locking member 3. That is, the reset strip and the corresponding locking member 3 are integrally formed. The limiting wall 10422 is formed by a wall of a part of a rib plate of the second rib plate set 1042.

A moving direction of the button 2 is substantially parallel to an extending direction of the first pin shaft 391, which is convenient for manufacture. Although in this embodiment, the inclined surface 220 is formed on the inner end 22 of the button 2 to push each locking member 3 to rotate, in another embodiment, the inclined surface is disposed on the first end **301*a* of the locking member 3, or the inclined surface is disposed on both the inner end 22 of the button 2 and the first end 301*a* of the locking member 3. Therefore, when the button 2 is pressed from the initial position to the pressing position, the inner end 22 of the button 2 and the first end 301*a* of the locking member 3 causes the locking member 3 to rotate through the contact of the inclined surface, such that the second hook 3*a*2** is switched from the locked position to the unlocked position.

Although in this embodiment, the first elastic member 41 is described as a reset strip, in another embodiment, the first elastic member 41 also includes other implementations. For example, the first elastic member 41 is a spring disposed between the second arm 302 and the limiting wall 10422, or is a torsion disposed between the first pin shaft 391 and the locking member 3.

In some embodiments, a first movement limiting structure 201 is disposed between the button 2 and the housing 1, and the first movement limiting structure 201 is configured to limit a stroke of the button 2 between the initial position and the pressing position, and it also prevents the button 2 from disengaging from the button hole 120. There are many implementations of the first movement limiting structure 201. For example, referring to FIG. 7 and FIG. 8, the first movement limiting structure 201 includes a limiting hole 2010 and a second elastic arm 2012. The limiting hole 2010 is formed on the hole wall of the button hole 120, for example, on the annular extension plate 10421 (a second hole segment **120*b* of the button hole 120 is defined by the annular extension plate 10421). The second elastic arm 2012 is integrated with the button 2. A first end 2012*a* of the second elastic arm 2012 to the outer end 21 of the button 2 is a connecting end, and a second end 2012*b* of the second elastic arm 2012 adjacent to the inner end 22 of the button 2 is a free end. The second end 2012*b* of the second elastic arm 2012 includes a boss 20121 slidably cooperating with the limiting hole 2010, and an end of the limiting hole 2010 limits a sliding position of the boss 20121, thereby limiting a stroke of the button 2**.

Referring to FIG. 8, in some embodiments, a second elastic member 42 is disposed between the button 2 and the housing 1 to maintain the button 2 in the initial position. The second elastic member 42 enables the button 2 to elastically return from the pressing position to the initial position. It should be understood that in some embodiments, the second elastic member 42 is omitted. When the locking member 3 pivots around the first pin shaft 391 under an elastic recovery action of the first elastic member 41, the first arm 301 presses the inclined surface 220 to push the button 2 to the initial position for elastic return.

The second elastic member 42 is a spring. In some embodiments, a groove 20 is disposed on a middle portion of the button 2 and configured to accommodate the second elastic member 42, and an outer end **20*a* of the groove 20 limits an outer end of the second elastic member 42. The hole wall of the button hole 120 is provided with a protrusion 1200 configured to abut against an inner end of the second elastic member 42. It should be understood that, the protrusion 1200 does not affect the movement of the button 2 between the initial position and the pressing position. As such, when the button 2 is pressed to the pressing position, the second elastic member 42 is compressed between the outer end 20*a* of the groove 20 and the protrusion 1200 (a wall of the groove 20 includes an opening for the protrusion 1200 to protrude into the groove 20). When the pressing force applied to the button 2 is removed, the second elastic member 42 automatically elastically recovers and drives the button 2 to elastically return to the initial position. In some embodiments, the protrusion 1200 further includes a protruding post 1200*a*, and the inner end of the second elastic member 42 is sleeved on the protruding post 1200*a***.

Although the two locking members 3 are operably connected to the same button 2 in this embodiment, in another embodiment, one button 2 is configured to be operably connected to one locking member 3.

Referring to FIG. 11 to FIG. 19, which show schematic views of a side impact protection block 100 and a mounting base 5 cooperating with the side impact protection block 100 according to another embodiment of the present disclosure. This embodiment is similar to the aforementioned embodiment, while the structures of the housing 1, the button 2, the locking member 3, and the mounting base 5 are slightly different. If there is no conflict, the structures and connection relationships of the components in this embodiment refers to the description in the aforementioned embodiment.

Figure 13:
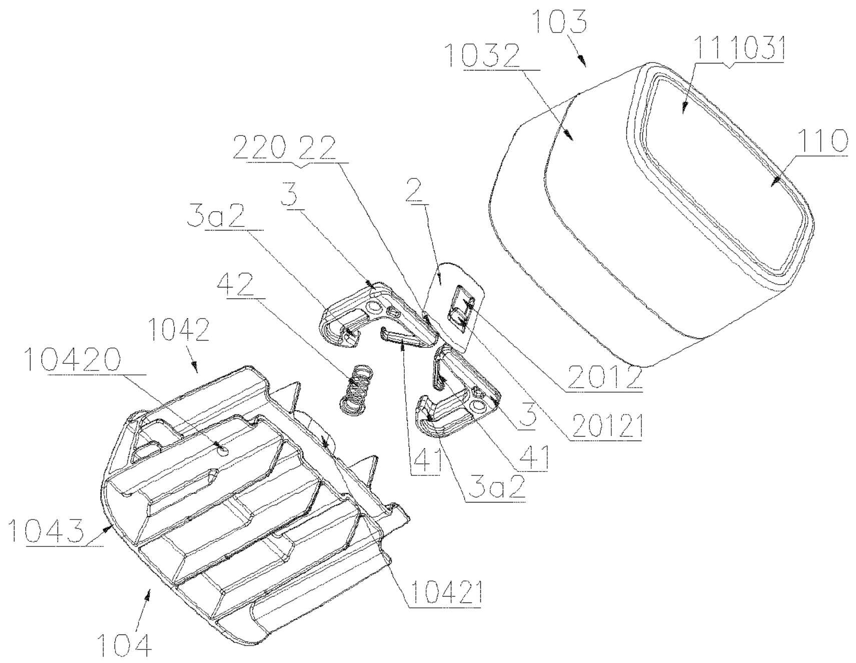
FIG. 13 shows a schematic exploded view of the side impact protection block in FIG. 11.
Figure 14:
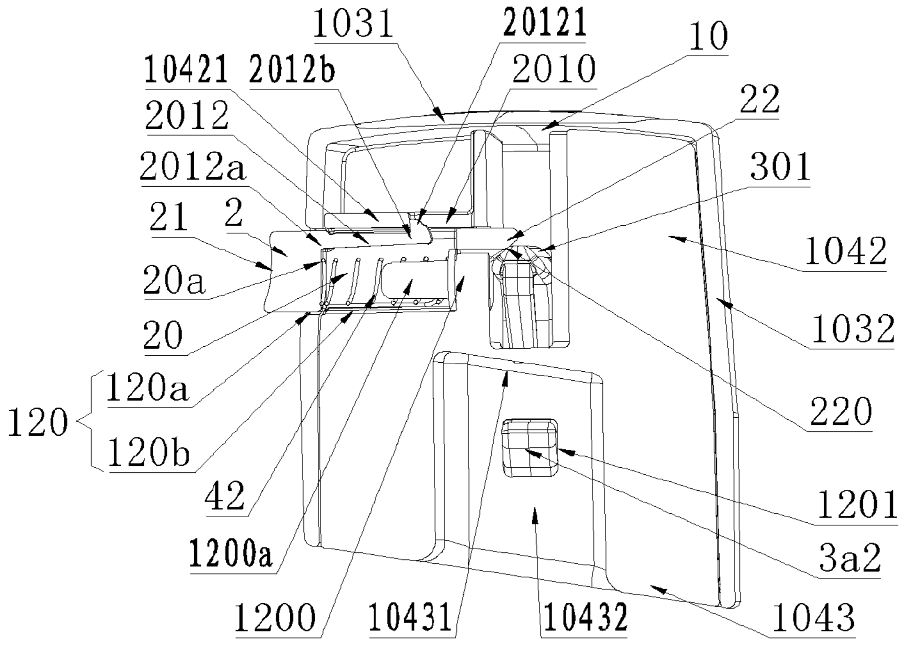
FIG. 14 shows a schematic cross-sectional view taken along a line D-D in FIG. 11, where the button is in an initial position, and the locking portion of a locking member is in a locked state.

Referring to FIG. 13 and FIG. 14, in this embodiment, the housing 1 similarly includes a third housing portion 103 and a fourth housing portion 104. The third housing portion 103 is hollow and has an opening at a bottom thereof. A top wall 1031 of the third housing portion 103 forms the top wall 11 of the housing 1, the side impact contact surface 110 is located on the top wall 1031 of the third housing portion 103, and a side wall 1032 of the third housing portion 103 forms an outer side wall of the housing 1. The fourth housing portion 104 is assembled to a bottom opening of the third housing portion 103. A bottom wall 1043 of the fourth housing portion 104 covers a bottom opening of the third housing portion 103 and forms a bottom wall 13 of the housing 1.

Figure 17:
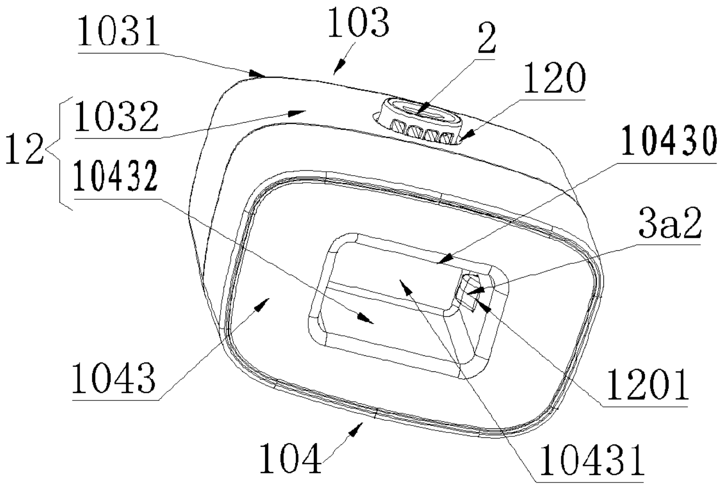
FIG. 17 shows a schematic perspective view of a side impact protection block in FIG. 11.

Referring to FIG. 17, the fourth housing portion 104 further includes a recess 10430 extending in a direction from a middle portion of the bottom wall 1043 toward a top wall 1031 of the third housing portion 103, such that the bottom wall 1043 has a generally annular shape. The recess 10430 includes a top wall 10431 and a side wall 10432, and the side wall 10432 forms an inner side wall of the housing 1. It should be understood that in this embodiment, the side wall 12 of the housing 1 includes the side wall 1032 of the third housing portion 103 and the side wall 10432 of the recess 10430. Referring to FIG. 13, the fourth housing portion 104 further includes a second rib plate set 1042 extending from the bottom wall 1043 to an interior of the third housing portion 103, and the second rib plate set 1042 is configured to reinforce the structural strength of the third housing portion 103. The recess 10430 is connected to the second rib plate set 1042 on a surface of an interior of the housing 1.

Referring to FIG. 14, the button 2 is slidably received in a button hole 120. The button hole 120 includes a first hole segment 120*a* defined on the side wall 1032 and a second hole segment 120*b* defined by an annular extension plate 10421 of the second rib plate set 1042. The first hole segment 120*a* is in communication with the second hole segment 120*b* to form the button hole 120. An outer end 21 of the button 2 is configured to bear a pressing force. An inner end 22 of the button 2 extends into the interior 10 of the housing 1 defined by the third housing portion 103 and the fourth housing portion 104.

Figure 15:
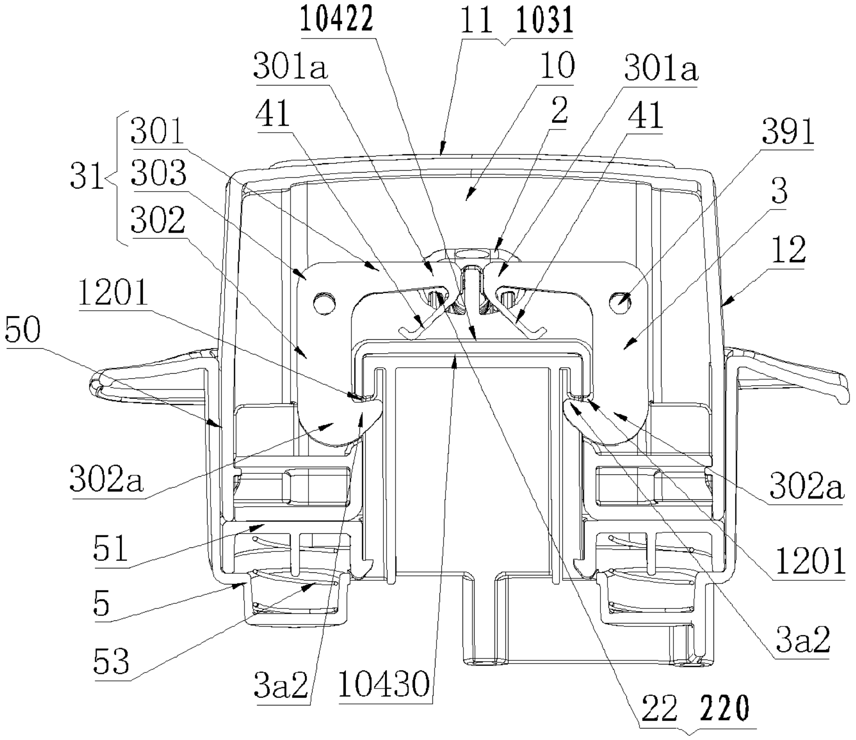
FIG. 15 shows a schematic cross-sectional view taken along a line E-E in FIG. 11, where the button is in an initial position, and the locking portion of a locking member is in a locked state.
Figure 16:
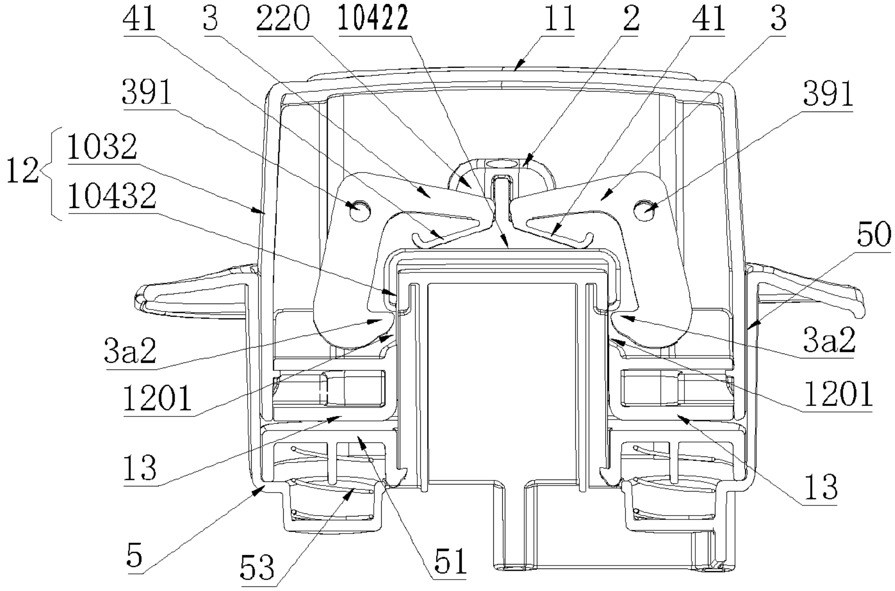
FIG. 16 shows a schematic cross-sectional view taken along a line E-E in FIG. 11 when the button is in a pressing position and the locking portion of the locking member is in an unlocked state.

Referring to FIG. 15 and FIG. 16, two locking members 3 are located in the interior 10 of the housing 1, and the two locking members 3 are substantially symmetrically arranged in the interior 10 of the housing 1, and are operably connected to the same button 2. Each locking member 3 includes a first arm 301, a corner portion 303, and a second arm 302 connected in sequence. A free end of the first arm 301, which is a first end 301*a* of the locking member 3, is in contact with the inner end 22 of the button 2. A contact surface of the inner end 22 of the button 2 for being in contact with the free end 301*a* of the first arm 301 is an inclined surface 220, and the inclined surface 220 faces away from the top wall 1031 of the third housing portion 103. The corner portion 303 is located in a middle portion of the locking member 3 and is pivotally connected to the housing 1 via a first pin shaft 391. The first pin shaft 391 is, for example, mounted in a hole 10420 (see FIG. 13) of the second rib plate set 1042. The locking portion includes a second hook 3*a*2 located at a free end (i.e., a second end 302*a* of the locking member 3) of the second arm 302, and the second hook 3*a*2 is bent towards the side wall 10432.

The first through hole 1201 is formed on the side wall 10432 of the recess 10430. A first elastic member 41 is further disposed in the interior 10 of the housing 1, and the first elastic member 41 is a reset strip integrally formed with the first arm 301 of the locking member 3. One end of the reset strip is connected to, for example, the free end 301*a* of the first arm 301, and the other end of the reset strip is in contact with, for example, a limiting wall 10422 of the interior 10 of the housing 1. The limiting wall 10422 is formed by walls of part of rib plates of the second rib plate set 1042, or by the partial surface of the recess 10430 in the interior 10 of the housing 1. The first elastic member 41 is configured to act on the locking member 3 to maintain the second hook 3*a*2 in a locked state extending from the first through hole 1201.

Figure 12:
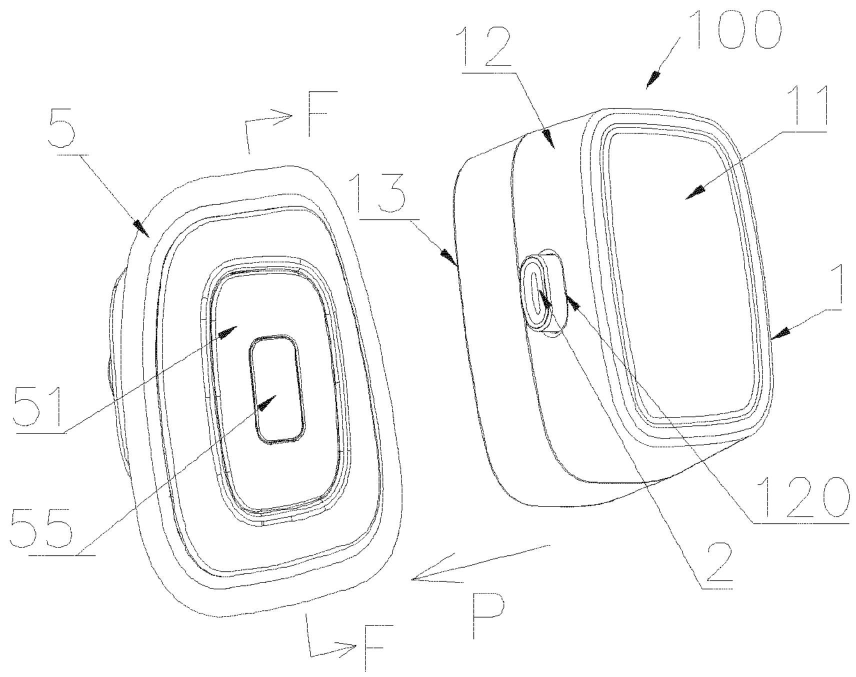
FIG. 12 shows a schematic perspective view of the side impact protection block in FIG. 11 removed from a mounting base.
Figure 18:
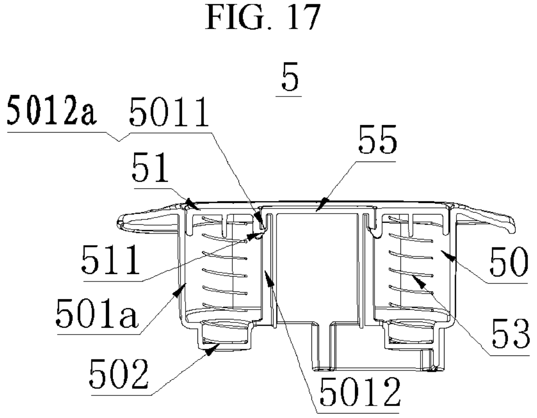
FIG. 18 shows a schematic cross-sectional view taken along a line F-F in FIG. 12.
Figure 19:
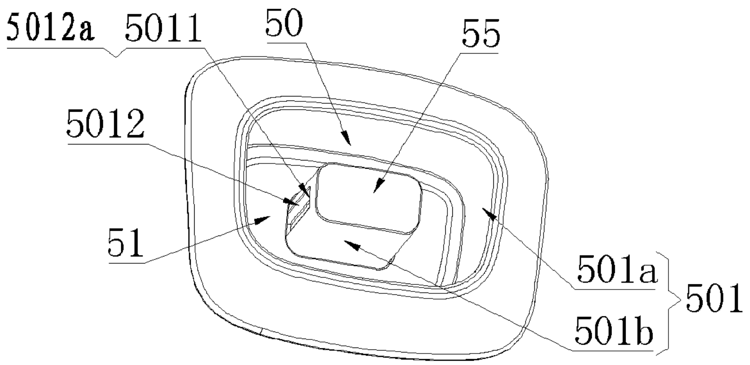
FIG. 19 shows a schematic perspective view of a mounting base in FIG. 12, where an end cap is pressed to a bottom of a mounting groove.
Figure 20:
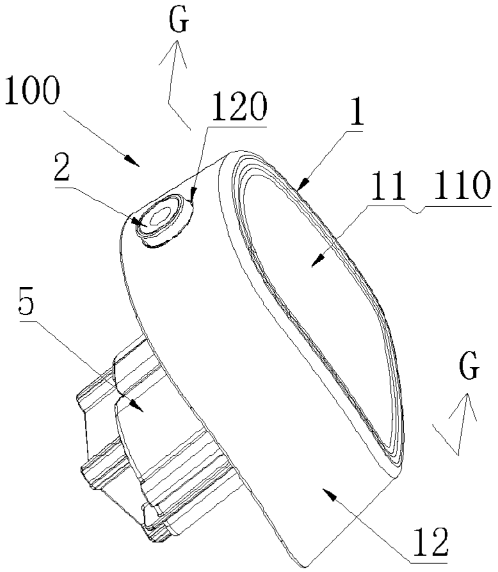
FIG. 20 shows a schematic perspective view of a side impact protection block mounted on a mounting base according to another embodiment of the present disclosure.

Referring to FIG. 12, FIG. 18, and FIG. 19, in this embodiment, a protrusion is disposed in a mounting groove 50 of the mounting base 5 for inserting into the recess 10430 of the fourth housing portion 104, and the protrusion 55 is of a hollow structure. The side wall 501 of the mounting groove 50 includes an outer peripheral side wall 501*a* and an inner peripheral side wall 501*b*, and the locking hole 5011 for engaging with the second hook 3*a*2 of the locking member 3 is provided on the inner peripheral side wall 501*b*. The opening of the mounting groove 50 has an annular shape, and an annular end cap 51 is disposed in the mounting groove 50. As similar to the aforementioned embodiment, the end cap 51 is supported on an open end of the mounting groove 50 by a fourth elastic member 53, and the end cap 51 moves to a bottom of the mounting groove 50 when subjected to a pressing force, so as to expose the locking hole 5011. FIG. 19 shows a schematic perspective view of the end cap 51 pressed against the bottom of the mounting groove 50. As similar to the aforementioned embodiments, the end cap 51 includes a third elastic arm having a hook. For example, the hook of the third elastic arm is slidably received in a second sliding hole 5012 of the inner peripheral side wall 501*b*. In addition, a locking end 5012*a* of at least one second sliding hole 5012 coincides with at least one locking hole 5011.

Referring to FIG. 14 and FIG. 15, when the button 2 is in the initial position, a tip region of the inclined surface 220 is in contact with the first end 301*a* of the locking member 3, and the first elastic member 41 acts on the locking member 3 to maintain the second hook 3*a*2 in a locked state extending out of the first through hole 1201. In that case, the second hook 3*a*2 is engaged with a locking hole 5011 of the mounting base 5, and the side impact protection block 100 is not removed from the mounting groove 50. Referring to FIG. 14 and FIG. 16, when the outer end 21 of the button 2 is subjected to a pressing force and is switched from its initial position to a pressing position, the inclined surface 220 of the button 2 presses the first arm 301, such that the locking member 3 pivots around the first pin shaft 391 against a force of the first elastic member 41, and the second hook 3*a*2 is switched to an unlocked state retreating from the first through hole 1201. At that time, the side impact protection block 100 is easily removed from the mounting groove 50. When the side impact protection block 100 requires to be inserted into the mounting groove of the mounting base 5 again, the side impact protection block 100 is inserted into the mounting groove 50 along a direction as an arrow P shown in FIG. 12.

Similar to the aforementioned embodiment, a moving direction of the button 2 is substantially parallel to an extending direction of the first pin shaft 391. A first movement limiting structure 201 is provided between the button 2 and the housing 1 (see FIG. 7), and the first movement limiting structure 201 is configured to limit a stroke of the button 2 between the initial position and the pressing position, and also prevents the button 2 from falling off from the button hole 120. A second elastic member 42 configured to maintain the button 2 in the initial position is further provided between the button 2 and the housing 1. The second elastic member 42 enables the button 2 to elastically return from the pressing position to the initial position. The implementations of the first movement limiting structure 201 and the second elastic member 42 will not be repeated herein again.

Although the two locking members 3 are operably connected to the same button 2 in this embodiment, in another embodiment, one button 2 is configured to be operably connected to one locking member 3. In addition, in this embodiment, although the inclined surface 220 is formed on the inner end 22 of the button 2 to push each locking member 3 to rotate, it should be understood that, in another embodiment, the inclined surface is disposed on the first end 301*a* of the locking member 3, or the inclined surface is disposed on both the inner end 22 of the button 2 and the first end 301*a* of the locking member 3. Therefore, when the button 2 is pressed from the initial position to the pressing position, the inner end 22 of the button 2 and the first end 301*a* of the locking member 3 causes the locking member 3 to rotate through the contact of the inclined surface, such that the second hook 3*a*2 is switched from a locked position to an unlocked position. In addition, the implementation of the first elastic member 41 is also not limited to the reset strip.

Referring to FIG. 20 to FIG. 25, which show schematic views of a side impact protection block 100 and a mounting base 5 cooperating with the side impact protection block 100 according to another embodiment of the present disclosure. The main difference between this embodiment and the aforementioned embodiment lies in the structure of the side impact protection block 100.

Referring to FIG. 21, and FIG. 23 to FIG. 25, the mounting base 5 has a mounting groove 50 similar to other embodiments, and the mounting groove 50 is configured to partially accommodate the housing 1 of the side impact protection block 100. The bottom wall 13 and at least a part of the side wall 12 of the housing 1 are accommodated in the mounting groove 50. A side wall 501 of the mounting groove 50 includes a locking hole 5011, and the locking hole 5011 is configured to be fitted with a locking portion of a locking member 3.

An end cap 51 is disposed in the mounting groove 50 of the mounting base 5. When the side impact protection block 100 is not mounted in the mounting groove 50, the end cap 51 seals an opening of the mounting groove 50. The end cap 51 is, for example, supported at the opening of the mounting groove 50 by at least one fourth elastic member 53 in the mounting groove 50. When the side impact protection block 100 is mounted in the mounting groove 50, the end cap 51 compresses the fourth elastic member 53 after subjected to a pressing force of the bottom wall 13 of the housing 1. The end cap 51 moves toward a bottom 502 of the mounting groove 50, and at the same time, the locking hole 5011 of the side wall 501 of the mounting groove 50 is exposed, so as to be locked with the locking portion of the locking member 3 of the side impact protection block 100.

One or more third elastic arms 511 are located on the end cap 51, and the third elastic arm 511 includes a hook 511*a*. The side wall 501 of the mounting groove 50 includes with one or more second sliding holes 5012. The hook 511*a* is engaged with a locking end 5012*a* of the second sliding hole 5012, so as to fix the end cap 51 to a position sealing the opening of the mounting groove 50. When the end cap 51 is subjected to a pressing force, the hook 511*a* moves along the second sliding hole 5012 to allow the side impact protection block 100 to be inserted into the mounting groove 50, and to allow the locking hole 5011 to be exposed to cooperate with the locking portion of the locking member 3.

In some embodiments, the fourth elastic member 53 includes two springs spaced apart, which provides sufficient support for the end cap 51 with a larger area. In other embodiments, the fourth elastic member 53 includes only one spring or more springs.

In some embodiments, the at least one locking hole 5011 coincides with the locking end 5012*a* of the at least one second sliding hole 5012, which is beneficial for simplifying the manufacturing process.

Figure 22:
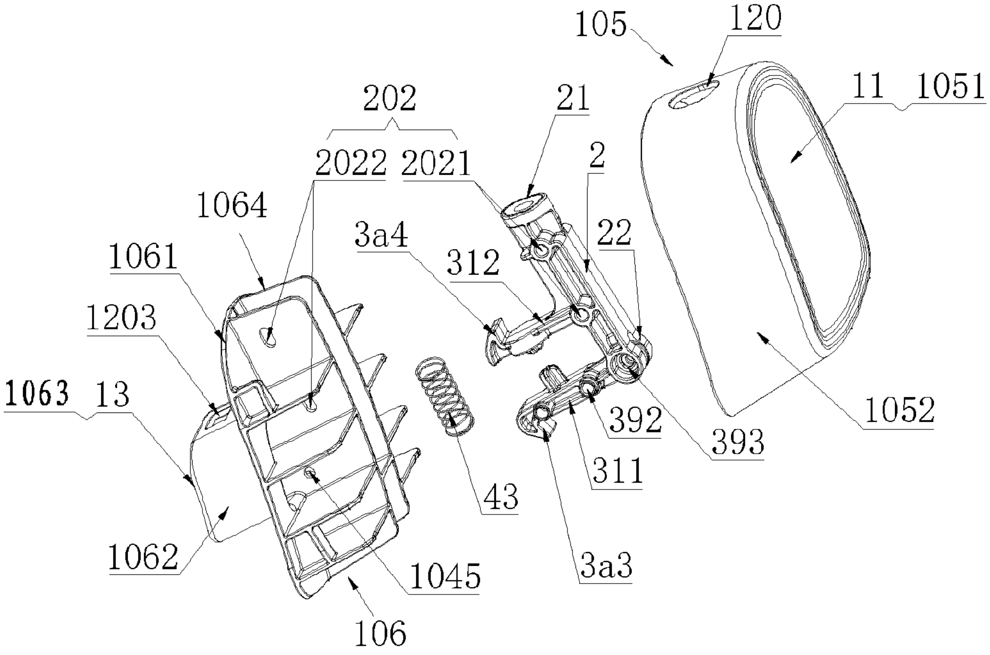
FIG. 22 shows a schematic exploded view of the side impact protection block in FIG. 20.
Figure 23:
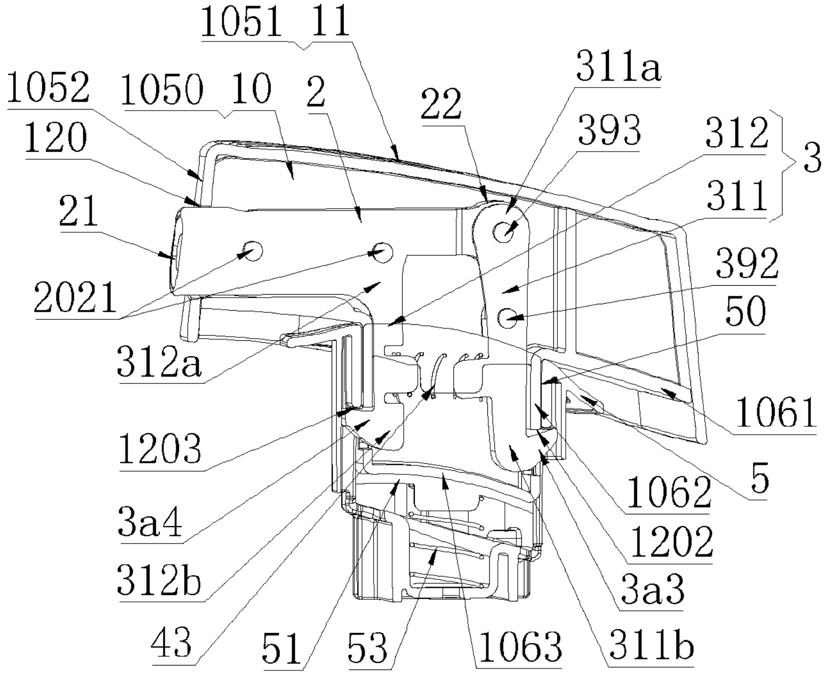
FIG. 23 shows a schematic cross-sectional view taken along a line G-G in FIG. 20, where the button is in an initial position, and the locking portion of a locking member is in a locked state.
Figure 24:
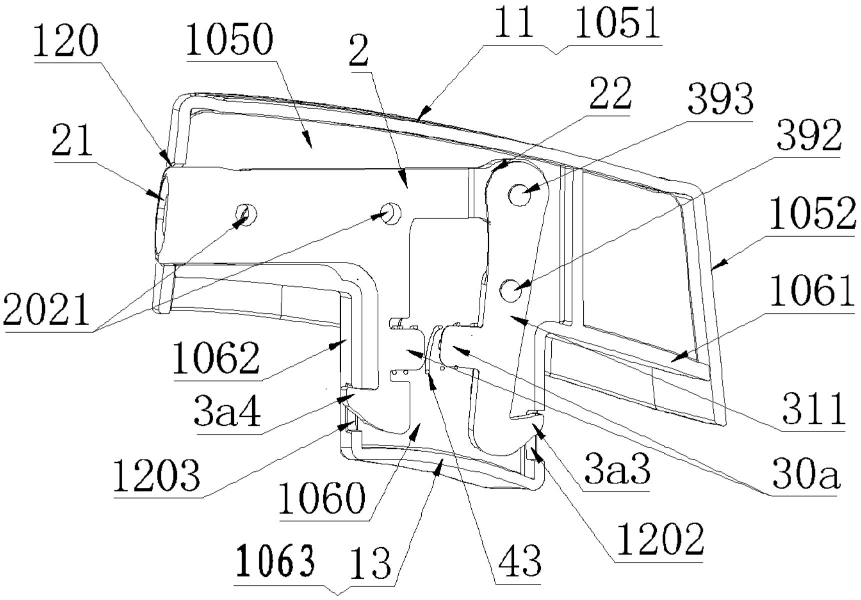
FIG. 24 shows a schematic cross-sectional view taken along a line G-G in FIG. 20 when the button is in a pressing position and the locking portion of a locking member is in an unlocked state.

Referring to FIG. 22, in this embodiment, the housing 1 includes a fifth housing portion 105 and a sixth housing portion 106. Referring to FIG. 23 and FIG. 24, the fifth housing portion 105 includes a first hollow cavity 1050 with an opening at a bottom thereof, and a top wall 1051 of the fifth housing portion 105 forms the top wall 11 of the housing 1. A side impact contact surface 110 is located at the top wall 1051 of the fifth housing portion 105, and the fifth housing portion 105 has a side wall 1052. The sixth housing portion 106 includes a second hollow cavity 1060 with an opening at a top thereof, and an extension plate 1061 at a top port of the second hollow cavity 1060. The extension plate 1061 extends outwardly from the top port of the second hollow cavity 1060 and is assembled to a bottom opening of the fifth housing portion 105. The sixth housing portion 106 has a side wall 1062. A bottom wall 1063 of the sixth housing portion 106 forms the bottom wall 13 of the housing 1. The sixth housing portion 106 further includes a third rib plate set 1064 located on the extension plate 1061. The third rib plate set 1064 extends into the first hollow cavity 1050, and is configured to reinforce the structural strength of the fifth housing portion 105.

An interior 10 of the housing 1 is enclosed by the first hollow cavity 1050 and the second hollow cavity 1060. The side wall 12 of the housing 1 includes the side wall 1052 of the fifth housing portion 105 and the side wall 1062 of the sixth housing portion 106. The button 2 is provided in a button hole 120 in communication with the side wall 12 of the housing 1. In this embodiment, the button hole 120 is in communication with the side wall 1052 of the fifth housing portion 105. The outer end 21 of the button 2 is configured to bear a pressing force, and the inner end 22 of the button 2 extends into the interior 10 of the housing 1. In this embodiment, referring to FIG. 23, when the button 2 is in the initial position, the outer end 21 of the button 2 protrudes from the side wall 1052.

Referring to FIG. 23 and FIG. 24, the locking member 3 includes a first locking member 311 located in the interior 10 of the housing 1, and a first end 311*a* of the first locking member 311 is pivotally connected to the inner end 22 of the button 2 via a third pin shaft 393, such that the first end 311*a* of the first locking member 311 is operably connected to the button 2. The locking portion includes a third hook 3*a*3 disposed on a second end 311*b* of the first locking member 311, a middle portion of the first locking member 311 is pivotally connected to the housing 1 via a second pin shaft 392, and the second pin shaft 392 is mounted, for example, in a hole 1045 of the third rib plate set 1064. The side wall 12 of the housing 1 is provided with a second through hole 1202 allowing the third hook 3*a*3 to extend through, and the second through hole 1202 is disposed, for example, on the side wall 1062 of the sixth housing portion 106.

A third elastic member 43 is further disposed in the interior 10 of the housing 1, and the third elastic member 43 acts on the first locking member 311 to maintain the third hook 3*a*3 in a locked state extending out of the second through hole 1202 and maintain the button 2 in the initial position. When the outer end 21 of the button 2 is subjected to a pressing force and is switched from the initial position to the pressing position, the inner end 22 of the button 2 drives the first locking member 311 to pivot around the second pin shaft 392 to overcome a force of the third elastic member 43, such that the third hook 3*a*3 is switched to an unlocked state retreating from the second through hole 1202. When the pressing force applied to the button 2 is removed, the third elastic member 43 automatically drives the first locking member 311 to rotate around the second pin shaft 392, such that the third hook 3*a*3 is elastically returned to the locked state, and the button 2 is elastically returned to the initial position. In some embodiments, the third elastic member 43 is disposed, for example, between the first locking member 311 and part of rib plates of the third rib plate set 1064.

Referring to FIG. 23 and FIG. 24, the locking member 3 further includes a second locking member 312 located in the interior 10 of the housing 1. A first end 312*a* of the second locking member 312 is fixedly connected to a middle portion of the button 2, such that the second locking member 312 is indirectly connected to the first end 311*a* of the first locking member 311 via the button 2, and the button 2 is operably connected to the second locking member 312. Correspondingly, the locking portion includes a fourth hook **3*a*4 disposed on a second end 312*b* of the second locking member 312, and a bending direction of the fourth hook 3*a*4 is opposite to that of the third hook 3*a*3. The side wall 12 of the housing 1 includes a third through hole 1203 allowing the fourth hook 3*a*4 to extend through, and the third through hole 1203 is disposed, for example, on the side wall 1062 of the sixth housing portion 106. In some embodiments, the second locking member 312 and the button 2** are integrally formed.

The third elastic member 43 in this embodiment is a spring. Both ends of the spring are mounted on the first locking member 311 and the second locking member 312, respectively. For example, referring to FIG. 24, a columnar body **30*a* is respectively provided on the first locking member 311 and the second locking member 312, and both ends of the spring is respectively sleeved on the columnar body 30*a*. Referring to FIG. 23, when the button 2 is in the initial position, the third elastic member 43 also acts on the second locking member 312, such that the fourth hook 3*a*4 is maintained in a locked state protruding out of the third through hole 1203. Referring to FIG. 24, when the button 2 is subjected to a pressing force and moves from the initial position to the pressing position, the button 2 moves together with the second locking member 312 to overcome the force of the third elastic member 43, such that the fourth hook 3*a*4 is switched to an unlocked state retreating from the third through hole 1203**.

In some embodiments, a second movement limiting structure 202 is provided between the button 2 and the housing 1, and the second movement limiting structure 202 is configured to limit a stroke of the button 2 between the initial position and the pressing position. The second movement limiting structure 202 is implemented in various ways. For example, in an embodiment, referring to FIG. 22, the second movement limiting structure 202 includes a limiting pin 2021 and a first sliding hole 2022. The limiting pin 2021 is mounted on the button 2, and the first sliding hole 2022 is disposed in the housing 1. For example, the first sliding hole 2022 is disposed on the third rib plate set 1064. The limiting pin 2021 slidably cooperates with the first sliding hole 2022, and a limit sliding position of the limiting pin 2021 is limited by both ends of the first sliding hole 2022, such that the stroke of the button 2 is limited.

Figure 21:
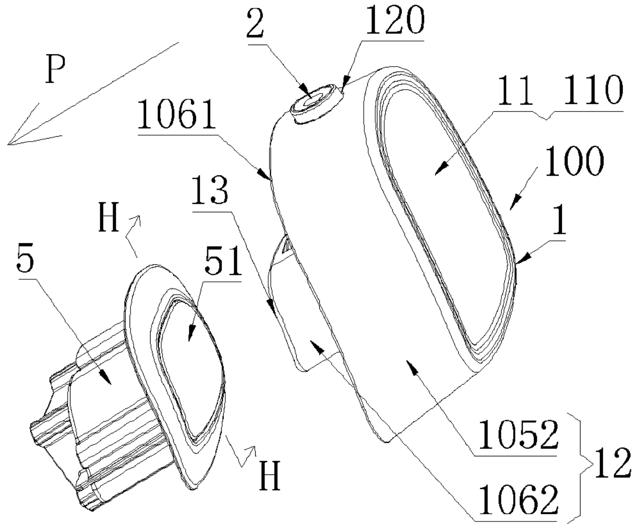
FIG. 21 shows a schematic perspective view of the side impact protection block in FIG. 20 removed from a mounting base.
Figure 25:
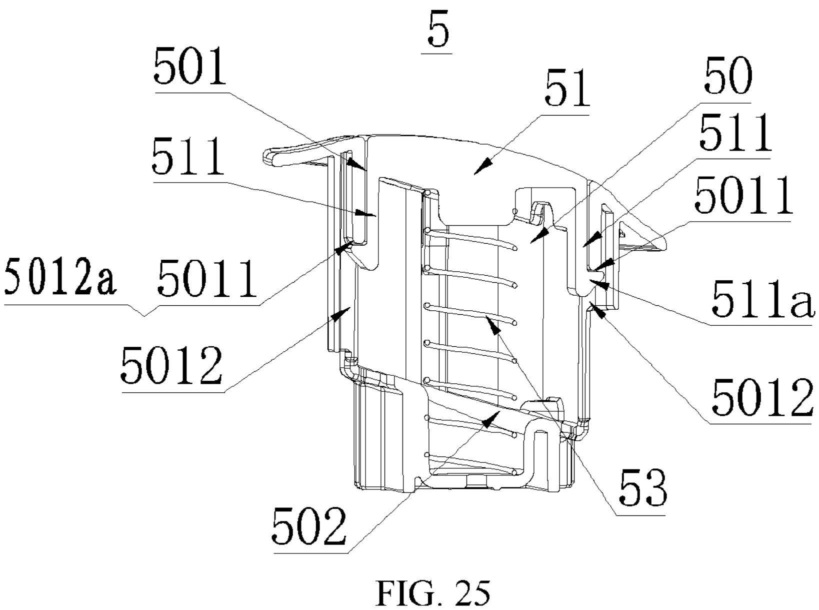
FIG. 25 shows a schematic cross-sectional view of a mounting base taken along a line H-H in FIG. 21.

Referring to FIG. 21, FIG. 23, and FIG. 25, the side impact protection block 100 of the embodiment is mounted into the mounting groove 50 of the mounting base 5 in a manner similar to other embodiments. For example, the side impact protection block 100 moves along a direction of an arrow P, and the bottom wall 13 pushes the end cap 51 to move toward the bottom 502 of the mounting groove 50. When the housing 1 of the side impact protection block 100 is inserted into position, the third hook **3*a*3 and the fourth hook 3*a*4 is respectively locked with the corresponding locking holes 5011. When the side impact protection block 100 requires to be removed, the button 2 is pressed from the initial position to the pressing position, and the first locking member 311 and the second locking member 312 are both driven to an unlocked state of being disengaged from the locking holes 5011. At that time, the side impact protection block 100 is easily removed from the mounting groove 50**.

Referring to FIG. 26 to FIG. 31, which show schematic views of a side impact protection block 100 and a mounting base 5 fitted with the side impact protection block 100 according to another embodiment of the present disclosure. The mounting base 5 in this embodiment is similar to the mounting base 5 in the aforementioned embodiment, the main difference between this embodiment and the aforementioned embodiment described above lies in the structure of the side impact protection block 100. In case of no conflict, the structures and connection relationships of the components in this embodiment refers to the description in the aforementioned embodiment.

Figure 26:
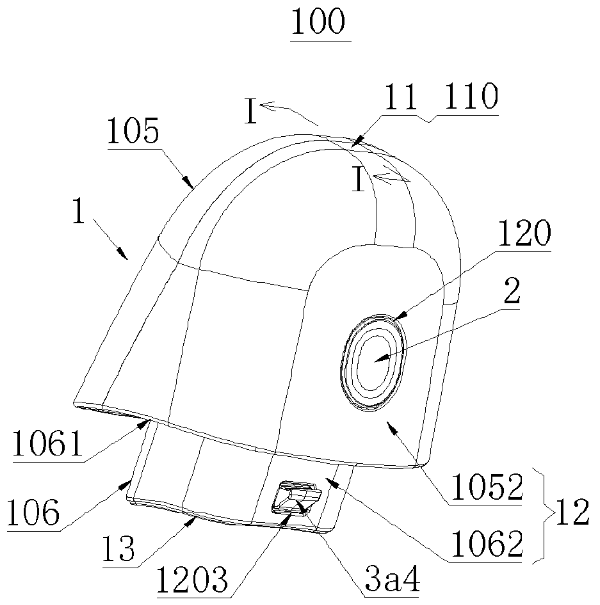
FIG. 26 shows a schematic perspective view of a side impact protection block mounted on a mounting base in one direction according to another embodiment of the present disclosure.
Figure 27:
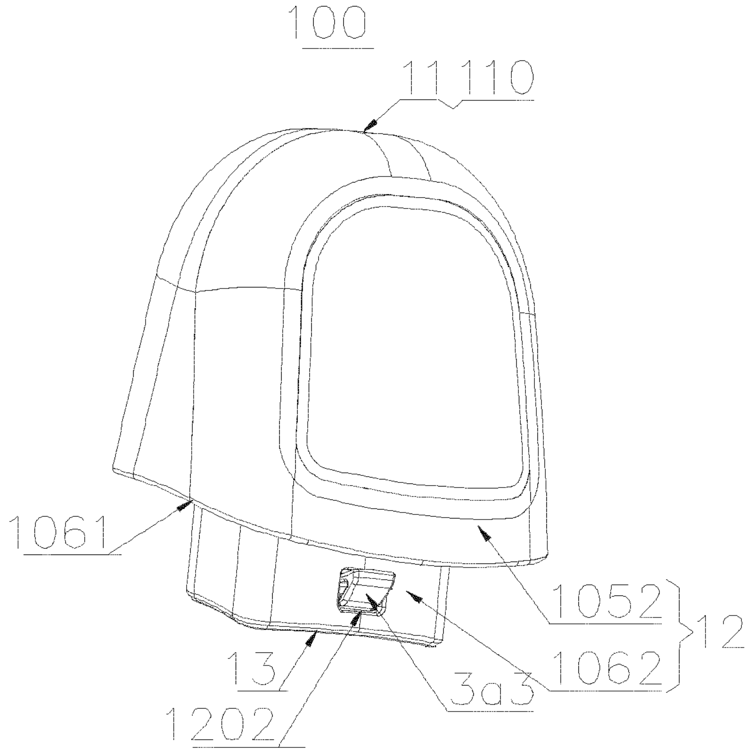
FIG. 27 shows another schematic perspective view of the side impact protection block in FIG. 26.
Figure 28:
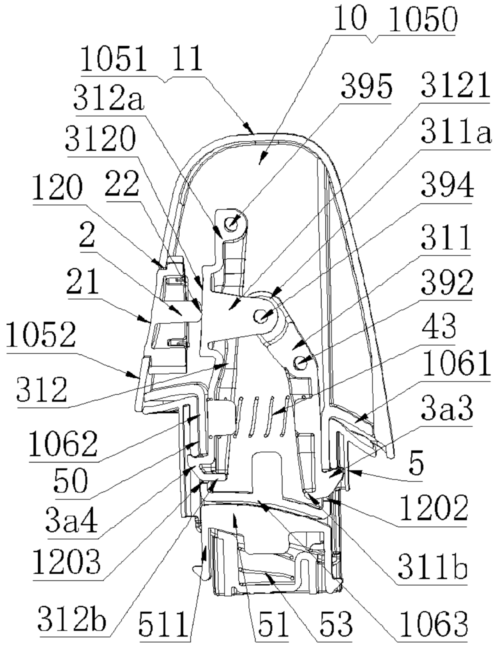
FIG. 28 shows a schematic cross-sectional view taken along a line I-I in FIG. where the button is in an initial position, and the locking portion of a locking member is in a locked state.
Figure 29:
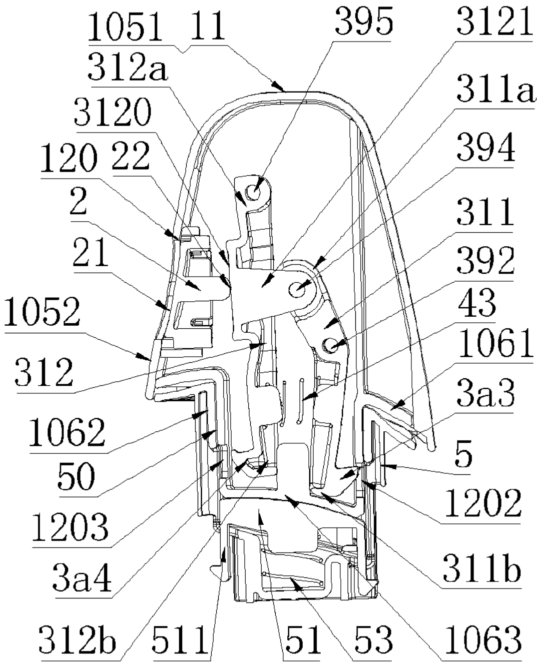
FIG. 29 shows a schematic cross-sectional view taken along a line I-I in FIG. when the button is in a pressing position and the locking portion of a locking member is in an unlocked state.
Figure 30:
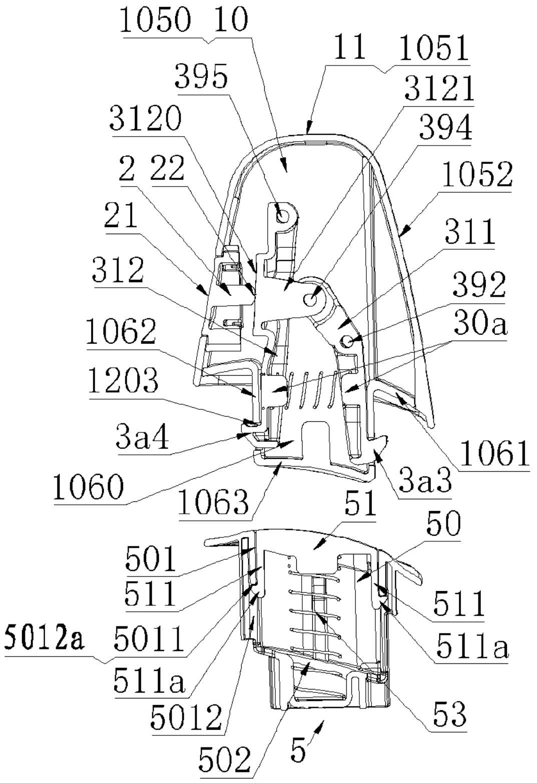
FIG. 30 shows schematic perspective views of the side impact protection block and the mounting base in FIG. 20 after the side impact protection block is removed from the mounting base.
Figure 31:
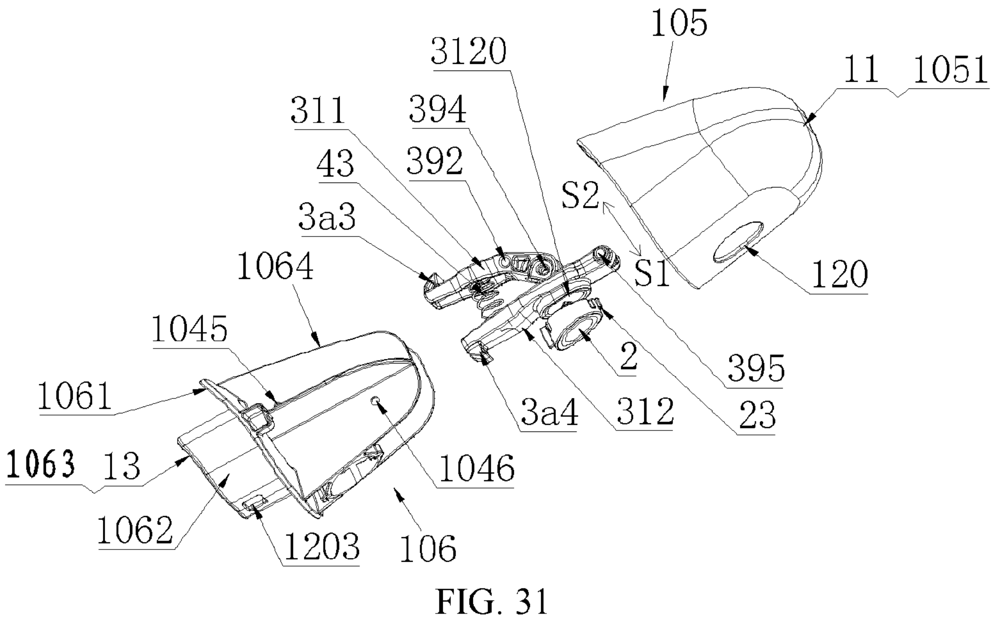
FIG. 31 shows a schematic exploded view of the side impact protection block in FIG. 26.

Referring to FIG. 26, FIG. 27, and FIG. 31, in this embodiment, the housing 1 includes a fifth housing portion 105 and a sixth housing portion 106. Referring to FIG. 28 and FIG. 29, the fifth housing portion 105 includes a first hollow cavity 1050 with an opening at a bottom thereof. A top wall 1051 of the fifth housing portion 105 forms the top wall 11 of the housing 1, the side impact contact surface 110 is located on the top wall 1051 of the fifth housing portion 105. The fifth housing portion 105 includes a side wall 1052. The sixth housing portion 106 includes a second hollow cavity 1060 with an opening at a top thereof and an extension plate 1061 at a top opening of the second hollow cavity 1060. The extension plate 1061 extends outwardly from the top opening of the second hollow cavity 1060 and is assembled to a bottom opening of the fifth housing portion 105. The sixth housing portion 106 includes a side wall 1062, and a bottom wall 1063 of the sixth housing portion 106 forms the bottom wall 13 of the housing 1. The sixth housing portion 106 further includes a third rib plate set 1064 located on the extension plate 1061, and the third rib plate set 1064 extends into the first hollow cavity 1050, and is configured to reinforce the structural strength of the fifth housing portion 105.

An interior 10 of the housing 1 is enclosed by the first hollow cavity 1050 and the second hollow cavity 1060. The side wall 12 of the housing 1 includes the side wall 1052 of the fifth housing portion 105 and the side wall 1062 of the sixth housing portion 106. The button 2 is provided in a button hole 120 in communication with the side wall 12 of the housing 1. In this embodiment, the button hole 120 is in communication with the side wall 1052 of the fifth housing portion 105. An outer end 21 of the button 2 is configured to bear a pressing force, the inner end 22 of the button 2 extends into the interior of the housing 1. In this embodiment, referring to FIG. 28, when the button 2 is in the initial position, the outer end 21 of the button 2, for example, does not protrude from the side wall 1052.

Referring to FIG. 28 to FIG. 31, the locking member 3 includes a first locking member 311 and a second locking member 312 located in the interior 10 of the housing 1. The second locking member 312 is located between the inner end 22 of the button 2 and the first locking member 311. A first end **312*a* of the second locking member 312 is pivotally connected to the housing 1 via a fifth pin shaft 395, and the fifth pin shaft 395 is mounted, for example, in a hole 1046 of the third rib plate set 1064. A middle portion of the second locking member 312 is pivotally connected to a first end 311*a* of the first locking member 311 via a fourth pin shaft 394, a middle portion of the first locking member 311 is pivotally connected to the housing 1 via a second pin shaft 392, and the second pin shaft 392 is mounted, for example, in a hole 1045 of the third rib plate set 1064. The locking portion includes a third hook 3*a*3 disposed on a second end 311*b* of the first locking member 311, and a fourth hook 3*a*4 disposed on a second end 312*b* of the second locking member 312. The side wall of the housing 1 is provided with a second through hole 1202 allowing the third hook 3*a*3 to extend through, and a third through hole 1203 allowing the fourth hook 3*a*4** to extend through. The second through hole

1202 and the third through hole 1203 are provided, for example, on the side wall 1062 of the sixth housing portion 106.

The inner end 22 of the button 2 abuts against the middle portion of the second locking member 312, such that the button 2 is operably connected to the second locking member 312, and the button 2 is operably connected to the first end 311*a* of the first locking member 311.

A third elastic member 43 is further provided in the interior 10 of the housing 1, and the third elastic member 43 acts on the first locking member 311 and the second locking member 312, such that the third hook 3*a*3 and the fourth hook 3*a*4 are maintained in a locked state protruding from the second through hole 1202 and the third through hole 1203, respectively. At the same time, the second locking member 312 abuts against the inner end 22 of the button 2, therefore the button 2 is maintained in the initial position. When the outer end 21 of the button 2 is subjected to a pressing force and is switched from the initial position to the pressing position, the inner end 22 of the button 2 drives the second locking member 312 to pivot around the fifth pin shaft 395 against a force of the third elastic member 43, such that the fourth hook 3*a*4 is switched to an unlocked state retreating from the third through hole 1203. At the same time, the second locking member 312 drives the first locking member 311 to pivot around the second pin shaft 392 against a force of the third elastic member 43, such that the third hook 3*a*3 is switched to an unlocked state retreating from the second through hole 1202. When the pressing force applied to the button 2 is removed, the third elastic member 43 automatically drives the second locking member 312 to rotate around the fifth pin shaft 395 and drives the first locking member 311 to rotate around the second pin shaft 392, such that the fourth hook 3*a*4 and the third hook 3*a*3 elastically returns to the locked state, and the button 2 elastically returns to the initial position.

The third elastic member 43 in this embodiment is a spring. Both ends of the spring is mounted on the first locking member 311 and the second locking member 312, respectively. For example, referring to FIG. 30, a columnar body 30*a* is respectively provided on the first locking member 311 and the second locking member 312, and both ends of the spring are respectively sleeved on the columnar body 30*a*.

Referring to FIG. 28 and FIG. 31, in some embodiments, the middle portion of the second locking member 312 includes a contact platform 3120 protruding along a first direction S1 and a lug 3121 extending along a second direction S2 opposite to the first direction S1. The contact platform 3120 provides a plane large enough to maintain in contact with the inner end 22 of the button 2. The fourth pin shaft 394 is disposed in the lug 3121. In addition, in some embodiments, an outer peripheral wall of the button 2 includes a stopper 23 (see FIG. 31), and the stopper 23 prevents the button 2 from disengaging from the button hole 120 by, for example, being latched to an inner wall of the fifth housing portion 105 of the housing 1.

The method of mounting the side impact protection block 100 of the embodiment into the mounting groove 50 of the mounting base 5 and removing the side impact protection block 100 from the mounting groove 50 is similar to that of the aforementioned embodiment, which will not repeat again herein.

An embodiment of the present disclosure further provides a child safety seat. The child safety seat includes the mounting base 5 according to any of the foregoing embodiments.

An embodiment of the present disclosure further provides a child safety seat. The child safety seat includes the side impact protection block 100 and the mounting base according to any of the foregoing embodiments. The mounting base 5 is disposed on a side wing 91 of a child safety seat 9. The housing 1 of the side impact protection block 100 is partially accommodated in the mounting groove 50 of the mounting base 5, such that the locking portion of the locking member 3 is engaged with the locking hole 5011, and the locking portion of the locking member 3 is disengaged from the locking hole 5011 under driving of the button 2.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of the present disclosure, and their description is specific and detailed, but cannot therefore be understood as a limitation to the patent scope of the present disclosure. It should be noted that, a person of ordinary skill in the art may further make several variations and improvements without departing from the concept of the present disclosure, and these variations and improvements all fall within the protection scope of the present disclosure. Therefore, the protection scope of the patent of the present disclosure shall be topic to the appended claims.

The invention claimed is:

1. A side impact protection block, comprising:

a housing comprising a top wall, a side wall connected to the top wall, and a bottom wall connected to the side wall, and the top wall comprising a side impact contact surface;

a button disposed on the side wall of the housing, and wherein the button is capable of being pressed by a pressing force to a pressing position and elastically returning to an initial position after the pressing force is removed; and a locking member disposed in the housing and comprising a locking portion, wherein:

the button is operably connected to the locking member, and when the button is switched from the initial position to the pressing position, the locking member is driven by the button to be in an unlocked state, and when the button elastically returns to the initial position, the locking portion of the locking member elastically returns to a locked state, and the locking member comprises a first elastic arm located on the side wall of the housing, a first end of the first elastic arm adjacent to the top wall is a connecting end, a second end of the first elastic arm adjacent to the bottom wall is a free end, and the locking portion comprises a first hook disposed on the free end, and the button is located on a middle portion of the first elastic arm.

2. The side impact protection block according to claim 1, wherein the button is integrally formed with the first elastic arm; and/or the housing comprises a hollow first housing portion having an opening at a bottom thereof and a second housing portion assembled to the bottom of the first housing portion, a top wall of the first housing portion forms the top wall of the housing, a side wall of the first housing portion forms the side wall of the housing, a bottom wall of the second housing portion forms the bottom wall of the housing, the second housing portion further comprises a first rib plate set extending from the bottom wall of the second housing portion into an interior of the first housing portion, and the first rib plate set comprises a first limiting plate corresponding to the first elastic arm.

3. The side impact protection block according to claim 1, wherein the first elastic arm is integrally formed with the side wall of the housing.

4. A mounting base cooperating with the side impact protection block according to claim 1, wherein the mounting base comprises a mounting groove configured to partially accommodate the housing of the side impact protection block, and a side wall of the mounting groove comprises a locking hole.

5. The mounting base according to claim 4, wherein an end cap is disposed in the mounting groove, the end cap is supported at an opening of the mounting groove by an elastic member in the mounting groove, and the end cap compresses the elastic member when subjected to a pressing force and moves toward a bottom of the mounting groove.

6. The mounting base according to claim 5, wherein the end cap comprises an end cap elastic arm, the end cap elastic arm comprises a end cap hook, the side wall of the mounting groove comprises a sliding hole, and the end cap hook engages with a locking end of the sliding hole.

7. The mounting base according to claim 6, wherein the elastic member comprises two springs that are spaced apart; and/or the locking hole coincides with the locking end of the sliding hole.

8. A child safety seat, comprising the mounting base according to claim 4.

9. A child safety seat, comprising the side impact protection block according to claim 1 and a mounting base cooperating with the side impact protection block, wherein the mounting base is disposed outside a side wing of the child safety seat, the housing of the side impact protection block is partially accommodated in a mounting groove of the mounting base, and the locking member is configured to be engaged with a locking hole and be disengaged from the locking hole upon driving by the button.

10. A side impact protection block, comprising:

a housing comprising a top wall, a side wall connected to the top wall, and a bottom wall connected to the side wall, and the top wall comprising a side impact contact surface;

a button disposed on the side wall of the housing, and wherein the button is capable of being pressed by a pressing force to a pressing position and elastically returning to an initial position after the pressing force is removed; and a locking member disposed in the housing and comprising a locking portion, wherein:

the button is operably connected to the locking member, and when the button is switched from the initial position to the pressing position, the locking member is driven by the button to be in an unlocked state, and when the button elastically returns to the initial position, the locking portion of the locking member elastically returns to a locked state;

the button is disposed in a button hole formed on the side wall of the housing, and the button comprises an outer end configured to bear the pressing force and an inner end located in an interior of the housing;

the locking member is located in the interior of the housing, a middle portion of the locking member is pivotally connected to the housing via a first pin shaft, a first end of the locking member is in contact with the inner end of the button, and a contact surface of at least one of the first end and the inner end is an inclined surface, and the locking portion comprises a second hook located on a second end of the locking member;

the side wall of the housing is provided with a first through hole allowing the second hook to extend through, a first elastic member is disposed in the interior of the housing, and the first elastic member is configured to act on the locking member, such that the second hook is maintained in a locked state extending out of the first through hole; and when the button is subjected to the pressing force, and under an action of the inclined surface, the button drives the locking member to overcome a force of the first elastic member and pivot around the first pin shaft, such that the second hook is switched to an unlocked state retreating from the first through hole.

11. The side impact protection block according to claim 10, wherein the locking member comprises a first arm, a corner portion, and a second arm that are connected in sequence, a free end of the first arm forms the first end of the locking member, the first pin shaft is disposed on the corner portion, and a free end of the second arm forms the second end of the locking member.

12. The side impact protection block according to claim 10, wherein the first elastic member comprises a reset strip integrally formed with the locking member, and a limiting wall in contact with the reset strip is disposed in the interior of the housing.

13. The side impact protection block according to claim 10, wherein a moving direction of the button is substantially parallel to an extending direction of the first pin shaft; and/or a first movement limiting structure configured to limit a stroke of the button is disposed between the button and the housing.

14. The side impact protection block according to claim 13, wherein the first movement limiting structure comprises:

a limiting hole formed on a hole wall of the button hole;

a second elastic arm integrally formed with the button, a first end of the second elastic arm adjacent to an outer end of the button being a connecting end, and a second end of the second elastic arm adjacent to the inner end of the button being a free end, wherein the second end of the second elastic arm comprises a boss slidably cooperating with the limiting hole.

15. The side impact protection block according to claim 10, wherein the inclined surface is disposed on the inner end of the button; and/or a second elastic member configured to maintain the button in the initial position is disposed between the button and the housing.

16. The side impact protection block according to claim 15, wherein the second elastic member is a spring, a middle portion of the button is provided with a groove configured to accommodate the spring, an outer end of the groove is configured to limit an outer end of the spring, and a hole wall of the button hole is provided with a protrusion configured to abut against an inner end of the spring.

17. The side impact protection block according to claim 10, wherein two locking members are symmetrically arranged and connected to the same button.

18. The side impact protection block according to claim 10, wherein the housing comprises a hollow first housing portion having an opening at a bottom thereof and a second housing portion assembled to the bottom of the first housing portion;

a top wall of the first housing portion forms the top wall of the housing, the side wall of the housing comprises a side wall of the first housing portion, and the button hole is in communication with the side wall of the first housing portion;

a bottom wall of the second housing portion forms the bottom wall of the housing, the second housing portion further comprises a rib plate set extending from the bottom wall of the second housing portion into an interior of the first housing portion;

the locking member is mounted on the rib plate set by the first pin shaft.

19. The side impact protection block according to claim 18, wherein the side wall of the first housing portion defines a first hole segment; the rib plate set comprises an annular extension plate, and the annular extension plate defines a second hole segment; the first hole segment is in communication with the second hole segment to form the button hole.

20. The side impact protection block according to claim 18, wherein the first through hole is formed on the side wall of the first housing portion.

21. The side impact protection block according to claim 18, wherein the second housing portion further comprises a recess extending in a direction from a middle portion of the bottom wall of the second housing portion to the top wall of the first housing portion, the side wall of the housing further comprises a side wall of the recess, and the first through hole is formed on the side wall of the recess.

22. A side impact protection block, comprising:

a housing comprising a top wall, a side wall connected to the top wall, and a bottom wall connected to the side wall, and the top wall comprising a side impact contact surface;

a button disposed on the side wall of the housing, and wherein the button is capable of being pressed by a pressing force to a pressing position and elastically returning to an initial position after the pressing force is removed; and a locking member disposed in the housing and comprising a locking portion, wherein:

the button is operably connected to the locking member, and when the button is switched from the initial position to the pressing position, the locking member is driven by the button to be in an unlocked state, and when the button elastically returns to the initial position, the locking portion of the locking member elastically returns to a locked state;

the button is disposed in a button hole formed on the side wall of the housing, and the button comprises an outer end configured to bear the pressing force and an inner end located in an interior of the housing;

the locking member comprises a first locking member located in the interior of the housing, the button is operably connected to a first end of the first locking member, the locking portion comprises a first hook disposed at a second end of the first locking member, and a middle portion of the first locking member is pivotally connected to the housing via a first pin shaft;

a first through hole is disposed on the side wall of the housing and allows the first hook to extend through, a first elastic member is disposed in the interior of the housing, and the first elastic member is configured to act on the first locking member to maintain the first hook extending out of the first through hole; and when the button is subjected to the pressing force, the button drives the first locking member to pivot around the first pin shaft, such that the first hook retreats from the first through hole.

23. The side impact protection block according to claim 22, wherein the locking member further comprises a second locking member located in the interior of the housing, the second locking member is operably connected to the first end of the first locking member, and the button is operably connected to the second locking member;

the locking portion comprises a second hook disposed on the second locking member, a bending direction of the second hook is opposite to a bending direction of the first hook, and the side wall of the housing comprises a second through hole allowing the second hook to extend through.

24. The side impact protection block according to claim 23, wherein the first elastic member is a spring, both ends of the spring are mounted on the first locking member and the second locking member, respectively, the first elastic member is configured to act on the second locking member to maintain the second hook extending out of the second through hole; when the button is subjected to the pressing force, the button drives the second locking member to move, such that the second hook retreats from the second through hole.

25. The side impact protection block according to claim 23, wherein the first end of the first locking member is pivotally connected to an inner end of the button via a second pin shaft, and a first end of the second locking member is fixedly connected to a middle portion of the button.

26. The side impact protection block according to claim 23, wherein the second locking member is integrally formed with the button; and/or a movement limiting structure is between the button and the housing and is configured to limit a stroke of the button.

27. The side impact protection block according to claim 26, wherein the movement limiting structure comprises:

a limiting pin mounted on one of the button and the housing; and a first sliding hole disposed on the other one of the button and the housing, wherein the limiting pin slidably cooperates with the first sliding hole.

28. The side impact protection block according to claim 23, wherein the first end of the first locking member is pivotally connected to a middle portion of the second locking member via a second pin shaft, a first end of the second locking member is pivotally connected to the housing via a third pin shaft, and the second hook is disposed at a second end of the second locking member, and an inner end of the button abuts against the middle portion of the second locking member.

29. The side impact protection block according to claim 28, wherein the middle portion of the second locking member comprises a contact platform protruding along a first direction and a lug extending along a second direction opposite to the first direction, the contact platform abuts against the inner end of the button, and the second pin shaft is disposed on the lug; and/or an outer peripheral wall of the button comprises a stopper to prevent the button from disengaging from the button hole.

30. The side impact protection block according to claim 22, wherein the housing comprises a first housing portion and a second housing portion, the first housing portion comprises a first hollow cavity having an opening at a bottom thereof, and a top wall of the first housing portion forms the top wall of the housing;

the second housing portion comprises a second hollow cavity having an opening at a top thereof and an extension plate located at the top opening of the second hollow cavity, the extension plate is assembled to the bottom opening of the first housing portion, and a bottom wall of the second housing portion forms the bottom wall of the housing;

the side wall of the housing comprises a side wall of the first housing portion and a side wall of the second housing portion, the button hole is in communication with the side wall of the first housing portion, and the first through hole and a second through hole are provided on the side wall of the second housing portion.

31. The side impact protection block according to claim 30, wherein the second housing portion further comprises a rib plate set located on the extension plate, the rib plate set extends into the first hollow cavity, and the first pin shaft is mounted on the rib plate set.

* * * * *